(12) United States Patent
Takahashi

(10) Patent No.: US 9,024,999 B2
(45) Date of Patent: May 5, 2015

(54) INFORMATION PROCESSING APPARATUS, CONFERENCE SYSTEM, AND STORAGE MEDIUM

(71) Applicant: Masato Takahashi, Tokyo (JP)

(72) Inventor: Masato Takahashi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 72 days.

(21) Appl. No.: 13/903,096

(22) Filed: May 28, 2013

(65) Prior Publication Data

US 2013/0321562 A1    Dec. 5, 2013

(30) Foreign Application Priority Data

May 30, 2012  (JP) .................................. 2012-123113
Feb. 27, 2013  (JP) .................................. 2013-037568

(51) Int. Cl.
| H04N 7/14 | (2006.01) |
| H04N 7/15 | (2006.01) |
| H04L 29/06 | (2006.01) |
| H04L 12/18 | (2006.01) |

(52) U.S. Cl.
CPC .............. *H04N 7/152* (2013.01); *H04L 65/403* (2013.01); *H04L 65/1083* (2013.01); *H04L 65/1096* (2013.01); *H04L 12/1822* (2013.01)

(58) Field of Classification Search
USPC ................ 348/14.08; 379/93.21, 158, 202.01
See application file for complete search history.

(56) References Cited

U.S. PATENT DOCUMENTS

2011/0090822 A1*   4/2011   Lee et al. ...................... 370/260
2012/0275349 A1*   11/2012  Boyer et al. .................. 370/261

FOREIGN PATENT DOCUMENTS

| JP | 09-247644 | 9/1997 |
| JP | 2008-236553 | 10/2008 |

* cited by examiner

*Primary Examiner* — Olisa Anwah
(74) *Attorney, Agent, or Firm* — IPUSA, PLLC

(57) ABSTRACT

An information processing apparatus is provided for a conference system where a plurality of terminals are connected via a network to the information processing apparatus and exchange data via the information processing apparatus to conduct a conference. The information processing apparatus includes a detection unit that detects disconnection of a terminal from the information processing apparatus and recovery of the terminal from the disconnection; a recording unit; a data transmission unit; and a status management unit that causes the recording unit to start recording the data in a storage when the disconnection is detected by the detection unit, and causes the data transmission unit to transmit the data read from the storage to the terminal in response to a data transmission request from the terminal.

8 Claims, 19 Drawing Sheets

FIG.15

| ID | ROOM | IP ADDRESS | AUTHEN-TICATION | CONNECTION START TIME | CONNECTION END TIME | DISCONNECTION TIME | RECOVERY TIME | EVENT | FRAME RATE | PIXELS | NETWORK BANDWIDTH |
|---|---|---|---|---|---|---|---|---|---|---|---|
| 101 | A | 34.78.20.30 | OK | 1/5 09:15 | 1/5 11:15 | – | – | SUCCESSFULLY COMPLETED | 30 fps | 800x600 | 800 kbps |
| | A | 124.231.212.33 | OK | 1/12 09:15 | – | 1/12 10:09 | 1/12 10:15 | DISCONNECTED ONCE | 10 fps | 600x480 | 527 kbps |
| | A | 124.231.232.33 | OK | 1/12 10:15 | 1/12 11:15 | – | – | SUCCESSFULLY COMPLETED | 30 fps | 600x480 | 900 kbps |
| | ... | 145.34.56.28 | | 1/8 13:02 | 1/8 13:30 | | | | | | |
| 102 | B | 34.78.20.30 | OK | 1/8 13:02 | 1/8 13:30 | – | – | SUCCESSFULLY COMPLETED | 30 fps | 800x600 | 2340 kbps |
| | A | 24.23.22.3 | OK | 1/12 09:15 | 1/12 11:15 | – | – | SUCCESSFULLY COMPLETED | 30 fps | 800x600 | 1500 kbps |
| | D | 15.4.6.28 | OK | 1/15 13:02 | 1/15 13:30 | – | – | SUCCESSFULLY COMPLETED | 30 fps | 600x480 | 900 kbps |
| | ... | | | | | | | | | | |
| 103 | C | 34.78.20.30 | OK | 1/6 20:00 | 1/6 22:15 | – | – | SUCCESSFULLY COMPLETED | 30 fps | 1280 x1024 | 1900 kbps |
| | A | 124.231.212.33 | OK | 1/12 09:15 | 1/12 11:15 | – | – | SUCCESSFULLY COMPLETED | 30 fps | 600x480 | 1230 kbps |
| | D | 145.34.56.28 | OK | 1/15 13:02 | 1/15 13:30 | – | – | SUCCESSFULLY COMPLETED | 15 fps | 1024 x768 | 1000 Mbps |
| | ... | | | | | | | | | | |

INFORMATION PROCESSING APPARATUS, CONFERENCE SYSTEM, AND STORAGE MEDIUM

CROSS-REFERENCE TO RELATED APPLICATIONS

The present application is based upon and claims the benefit of priority of Japanese Patent Application No. 2012-123113, filed on May 30, 2012, and Japanese Patent Application No. 2013-037568, filed on Feb. 27, 2013, the entire contents of which are incorporated herein by reference.

BACKGROUND OF THE INVENTION

1. Field of the Invention

An aspect of this disclosure relates to an information processing apparatus, a conference system, and a storage medium.

2. Description of the Related Art

With the recent availability of broadband Internet lines, communications involving digital data such as video data, audio data, images, and documents are being widely performed. For example, there exists a video conference system where such digital data is sent and received via Internet lines to perform a teleconference between remote locations.

In a video conference system, for example, images and sounds of participants of a teleconference are captured and converted into digital data by a terminal in a conference room at one location and the digital data is sent to a terminal in a conference room at another location where the images are displayed on a display and the sounds are output from a speaker. Thus, a video conference system makes it possible to perform a conference between remote locations as if the participants are in the same conference room.

Japanese Laid-Open Patent Publication No. 2008-236553, for example, discloses a video conference system that uses a peer-to-peer network to enable respective terminals of conference participants to cache data and thereby makes it possible to play back the cached data at each of the terminals.

Here, in a video conference system employing a cloud network, disconnection of participating sites (i.e., remote sites participating in a video conference) may occur due to, for example, a decrease in the available network bandwidth, packet losses caused by a network failure, or other accidents (e.g., a blackout and a operational error).

When a video conference is held among more than two participating sites (e.g., five or six sites) and one of the participating sites is disconnected, the terminal at the disconnected participating site cannot receive data and therefore cannot play back the data. Accordingly, participants at the disconnected participating site cannot know what has been discussed in the video conference from when the disconnection occurs until when the connection is restored.

SUMMARY OF THE INVENTION

In an aspect of this disclosure, there is provided an information processing apparatus for a conference system where a plurality of terminals are connected via a network to the information processing apparatus and exchange data via the information processing apparatus to conduct a conference. The information processing apparatus includes a detection unit that detects disconnection of a terminal from the information processing apparatus and recovery of the terminal from the disconnection; a recording unit; a data transmission unit; and a status management unit that causes the recording unit to start recording the data in a storage when the disconnection is detected by the detection unit, and causes the data transmission unit to transmit the data read from the storage to the terminal in response to a data transmission request from the terminal.

BRIEF DESCRIPTION OF THE DRAWINGS

FIG. 15 is a drawing illustrating exemplary terminal information;

DESCRIPTION OF THE PREFERRED EMBODIMENTS

Preferred embodiments of the present invention are described below with reference to the accompanying drawings.

<First Embodiment>
<System Configuration>
[Peer-To-Peer Video Conference System]

Figure 1:
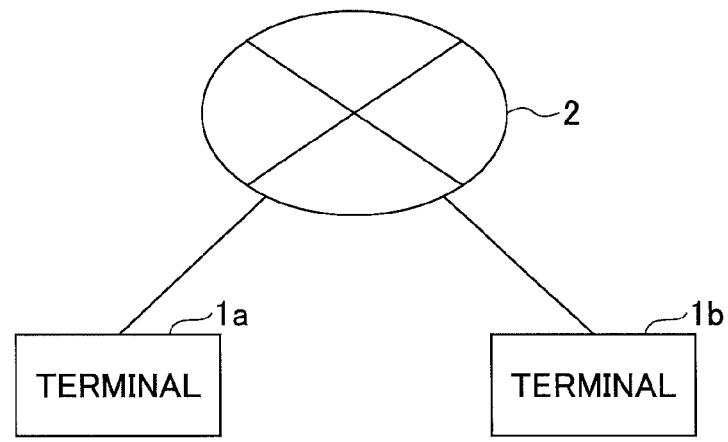
FIG. 1 is a drawing illustrating an exemplary configuration of a peer-to-peer video conference system.

FIG. 1 is a drawing illustrating an exemplary configuration of a peer-to-peer video conference system. In the exemplary peer-to-peer video conference system, a terminal 1a and a terminal 1b are connected via a network 2 such as the Internet to perform a video conference. In the video conference, the terminal 1a and the terminal 1b exchange data such as video data, audio data, images, and documents. Even in the peer-to-peer video conference system, a conference among multiple sites may be conducted by connecting a plurality of terminals 1, including the terminal 1a and the terminal 1b, to each other via a peer-to-peer network. Here, "peer-to-peer" indicates a communication method where multiple terminals are directly connected to each other to send and receive data.

[Cloud-Network Video Conference System]

Figure 2:
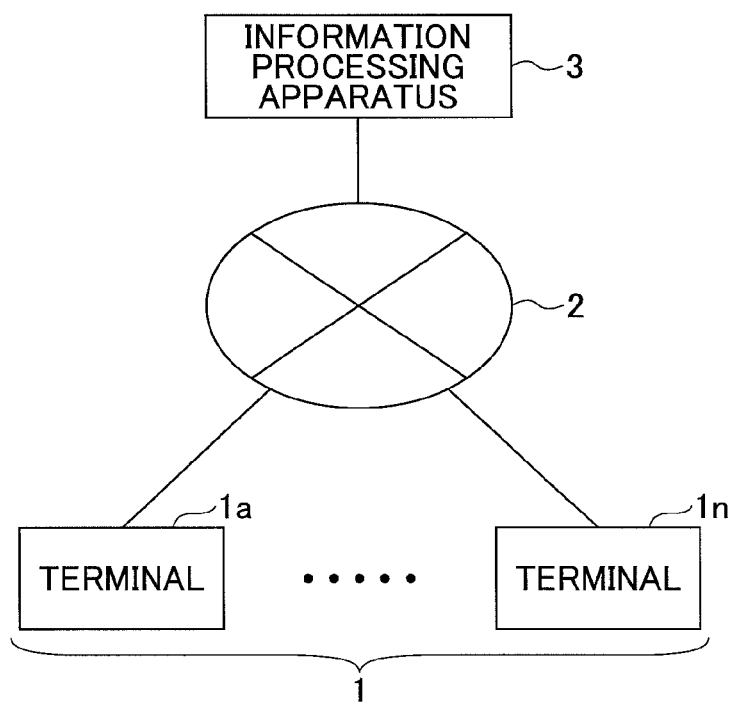
FIG. 2 is a drawing illustrating an exemplary configuration of a cloud-network video conference system.

FIG. 2 is a drawing illustrating an exemplary configuration of a cloud-network video conference system. In the exemplary cloud-network video conference system, all terminals 1a through 1n, concurrently performing a video conference (e.g., a remote conference or a multi-site conference), are connected via a network 2 such as the Internet to an information processing apparatus 3.

The information processing apparatus 3 is, for example, a server or a cloud server. The information processing apparatus 3 provides various services such as a cloud service by executing, for example, Web applications and server applications, and also provides hardware infrastructure for the terminals 1. For example, the information processing apparatus 3 provides various screens for the terminals 1 and includes functions for receiving data such as video data, audio data, images, and documents from the terminals 1, processing the received data, and transmitting the processed data to the terminals 1.

In a first embodiment, it is assumed that a cloud-network video conference system as illustrated by FIG. 2 is used. The cloud-network video conference system of FIG. 2 includes one or more terminals 1, the network 2, and the information processing apparatus 3. The terminal 1 is, for example, a video conference terminal. The terminal 1 may be implemented by any device or apparatus that can send data to the information processing apparatus 3 and output (e.g., play or display) data received from the information processing apparatus 3. Examples of the terminal 1 may include a smartphone, a tablet personal computer (PC), a notebook PC, a desktop PC, a cell phone, a personal digital assistant (PDA), and a projector.

The terminals 1 are connectable via the network 2 to the information processing apparatus 3. The network 2 may be a wired network, a wireless network, or a combination of them. The information processing apparatus 3 may be implemented by (or distributed on) multiple computers.

<Hardware Configuration>

[Terminal]

Figure 3A:
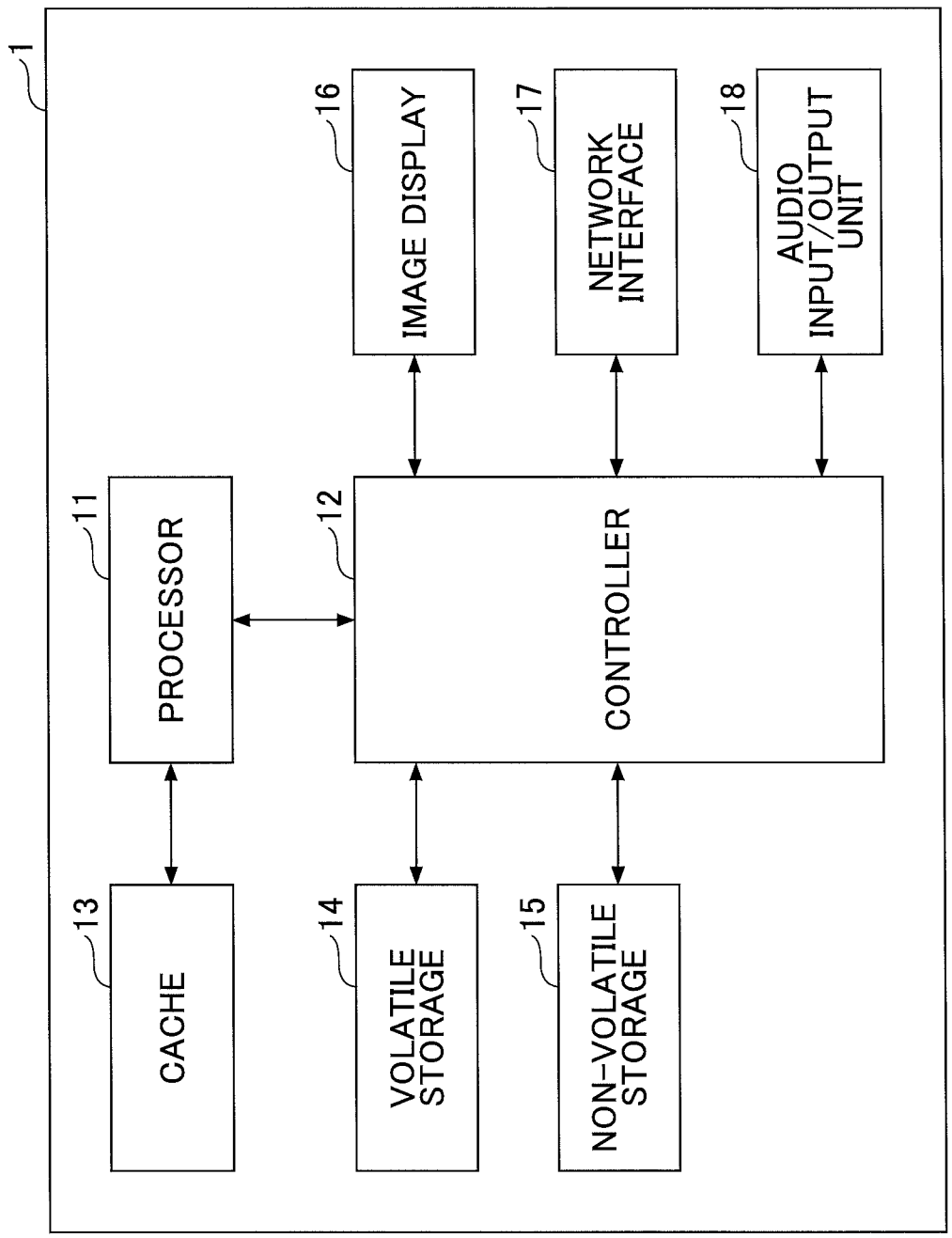
FIG. 3A is a block diagram illustrating an exemplary hardware configuration of a terminal.

FIG. 3A is an exemplary hardware configuration of the terminal 1. As illustrated by FIG. 3A, the terminal 1 may include a processor 11, a controller 12, a cache 13, a volatile storage 14, a non-volatile storage 15, an image display 16, a network interface 17, and an audio input/output unit 18. The processor 11 and the controller 12 may be implemented by a central processing unit (CPU). Alternatively, the processor 11 may be implemented by a data processing circuit and the controller 12 may be implemented by a CPU.

The processor 11 encodes and decodes data such as video data, audio data, and documents. The processor 11 also instructs the controller 12 to perform a process and receives the result of the process from the controller 12. Further, the processor 11 controls input and output of data to and from the cache 13.

The controller 12 controls interfaces (I/F) such as the image display 16 (e.g., a liquid-crystal display or a projector), the network interface 17 for connecting the terminal 1 to the network 2, and the audio input/output unit 18 (e.g., a microphone and a speaker). Also, the controller 12 controls input and output of data to and from the volatile storage 14 and the non-volatile storage 15.

The volatile storage 14 is a volatile memory for temporarily storing data. The non-volatile storage 15 is a non-volatile memory for storing, for example, software such as firmware of the terminal 1. The non-volatile storage 15 may also store data obtained after the occurrence of an error or failure such as a disconnection.

With the above hardware configuration, the controller 12 of the terminal 1 can provide various functions as described later.

[Information Processing Apparatus]

Figure 4A:
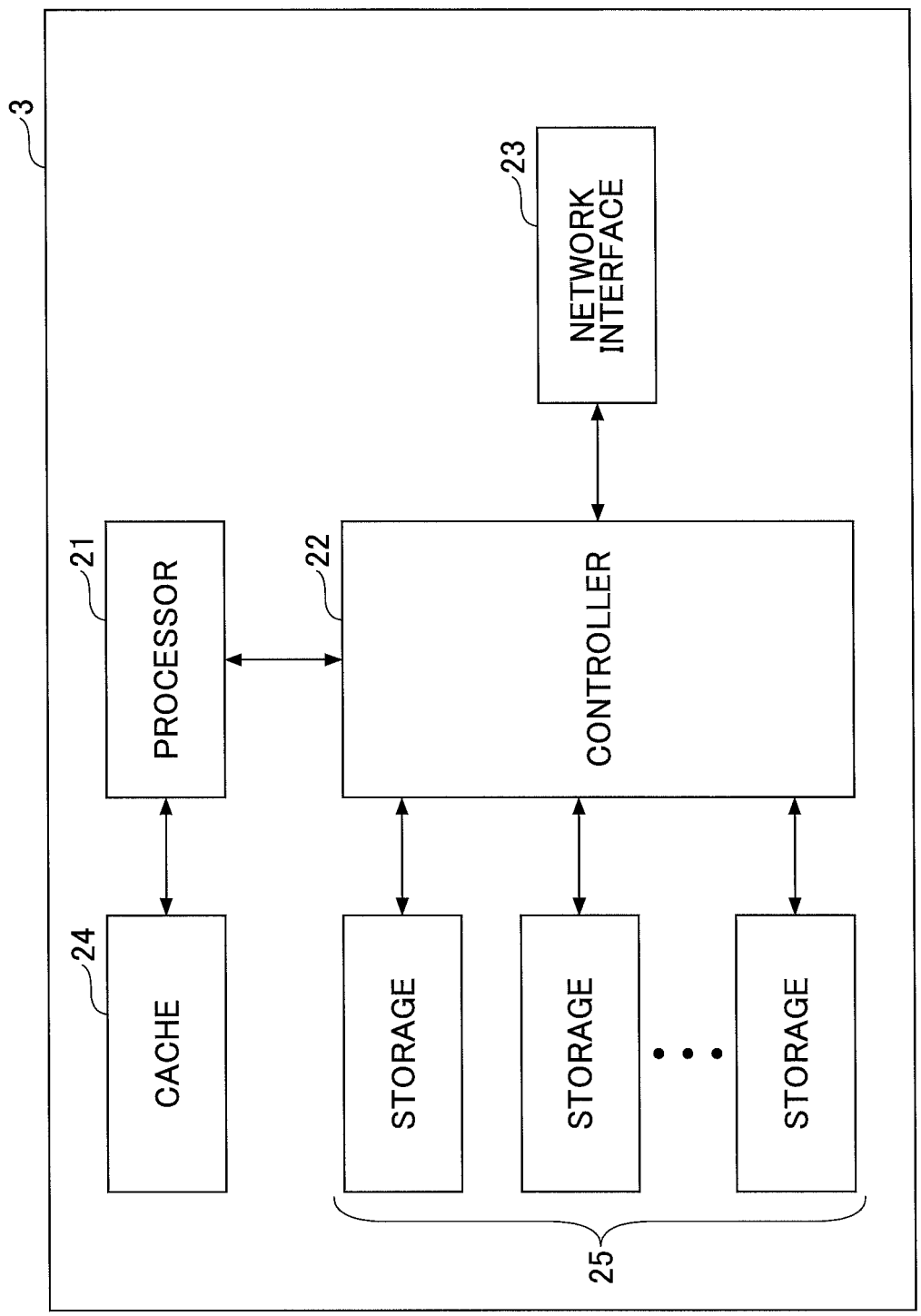
FIG. 4A is a block diagram illustrating an exemplary hardware configuration of an information processing apparatus.

FIG. 4A is an exemplary hardware configuration of the information processing apparatus 3. As illustrated by FIG. 4A, the information processing apparatus 3 may include a processor 21, a controller 22, a network interface 23, a cache 24, and storages 25. The processor 21 and the controller 22 may be implemented by a central processing unit (CPU). Alternatively, the processor 21 may be implemented by a data processing circuit and the controller 22 may be implemented by a CPU.

The processor 21 receives data such as video data, audio data, and documents from the terminal 1, processes the received data, and transmits the processed data to the terminal 1. The processor 21 also instructs the controller 22 to perform a process and receives the result of the process from the controller 22. Further, the processor 21 controls input and output of data to and from the cache 24.

The controller 22 controls interfaces (I/F) such as the network interface 23 for connecting the information processing apparatus 3 to the network 2. Also, the controller 22 controls input and output of data to and from the storages 25. The storages 25 are volatile and non-volatile memories. A storage 25 implemented by a volatile memory temporarily stores data. A storage 25 implemented by a non-volatile memory stores, for example, software such as firmware of the information processing apparatus 3.

The storages 25 may store data for a plurality of the terminals 1 and may concurrently record conferences being conducted at multiple sites. The storages 25 may be implemented by physically separate devices or may be implemented by segments of a large-capacity storage. Hereafter, the storages 25 may be collectively referred to as the storage 25 in the singular form.

Software such as firmware of the information processing apparatus 3 may be read from a storage medium and installed in one or more of the storages 25. Examples of the storage medium include a hard disk drive (HDD), a flexible disk, a compact disk (CD), a digital versatile disk (DVD), a secure digital (SD) memory card, and a universal serial bus (USB) memory. Also, software such as firmware may be downloaded via the network 2 and installed in the storages 25.

With the above hardware configuration, the controller 22 of the information processing apparatus 3 can provide various functions as described later.

<Software Configuration>

[Controller Of Information Processing Apparatus]

Figure 5:
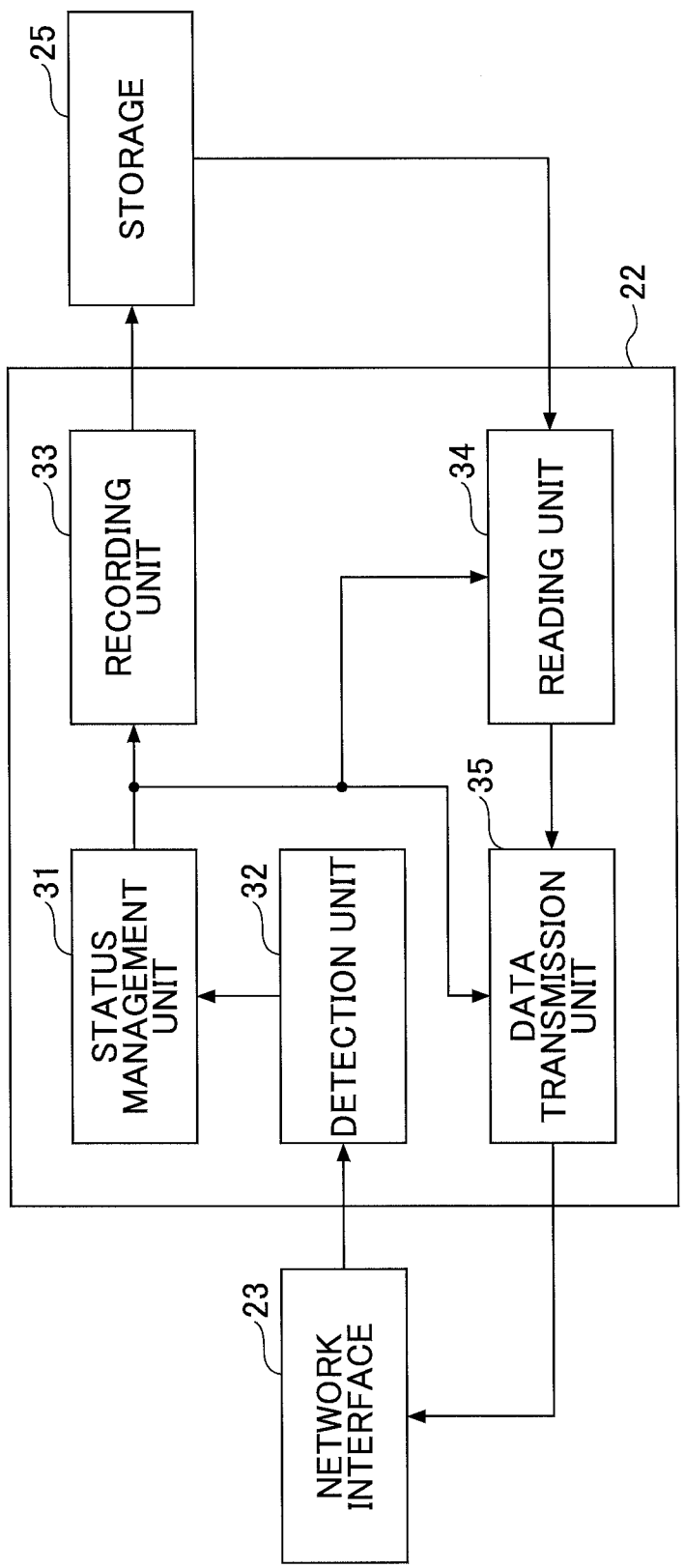
FIG. 5 is a block diagram illustrating an exemplary configuration of a controller of an information processing apparatus.

The controller 22 of the information processing apparatus 3 may include functional units (or processing blocks) as illustrated by FIG. 5. FIG. 5 is a block diagram illustrating an exemplary configuration of the controller 22 of the information processing apparatus 3. As in FIG. 5, the controller 22 may include a status management unit 31, a detection unit 32, a recording unit 33, a reading unit 34, and a data transmission unit 35.

The detection unit 32 detects network conditions or status of the terminals 1. The detection unit 32 sends the detected network conditions to the status management unit 31. For example, when an error (or failure) such as a disconnection occurs at a network or a terminal 1, the detection unit 32 detects the disconnection and reports the disconnection to the status management unit 31. Then, the status management unit 31 immediately reports the disconnection to the recording unit 33 and thereby requests the recording unit 33 to start storing (or recording) data (video conference data) in the storage 25.

Here, "video conference data" indicates any data such as video data, audio data, and documents related to a video conference.

When the error is recovered, the detection unit 32 detects the recovery from the error and reports the recovery to the status management unit 31. Then, the status management unit 31 reports the recovery to the recording unit 33 and thereby requests the recording unit 33 to stop storing data in the storage 25. The status management unit 31 also requests the reading unit 34 to read data from the storage 25.

The data transmission unit 35 obtains network information of the terminals 1 from the status management unit 31, attaches the network information to the data read from the storage 25, and transmits the data via the network interface 23 to the terminals 1. The status management unit 31 manages the status of the terminals 1. Also, the status management unit 31 monitors network delay, network connection and disconnection, and recovery of apparatuses. Further, the status management unit 31 can record settings (e.g., IDs and model numbers) of the terminals 1 and past and present events (e.g., time when errors occurred and information on the errors).

The status management unit 31 may include a cache implemented by a non-volatile memory and store information in the cache, or may store information in the storage 25. Similarly to the status management unit 31, the storage 25 stores data in association with the terminals 1.

[Control Unit of Terminal]

Figure 6:
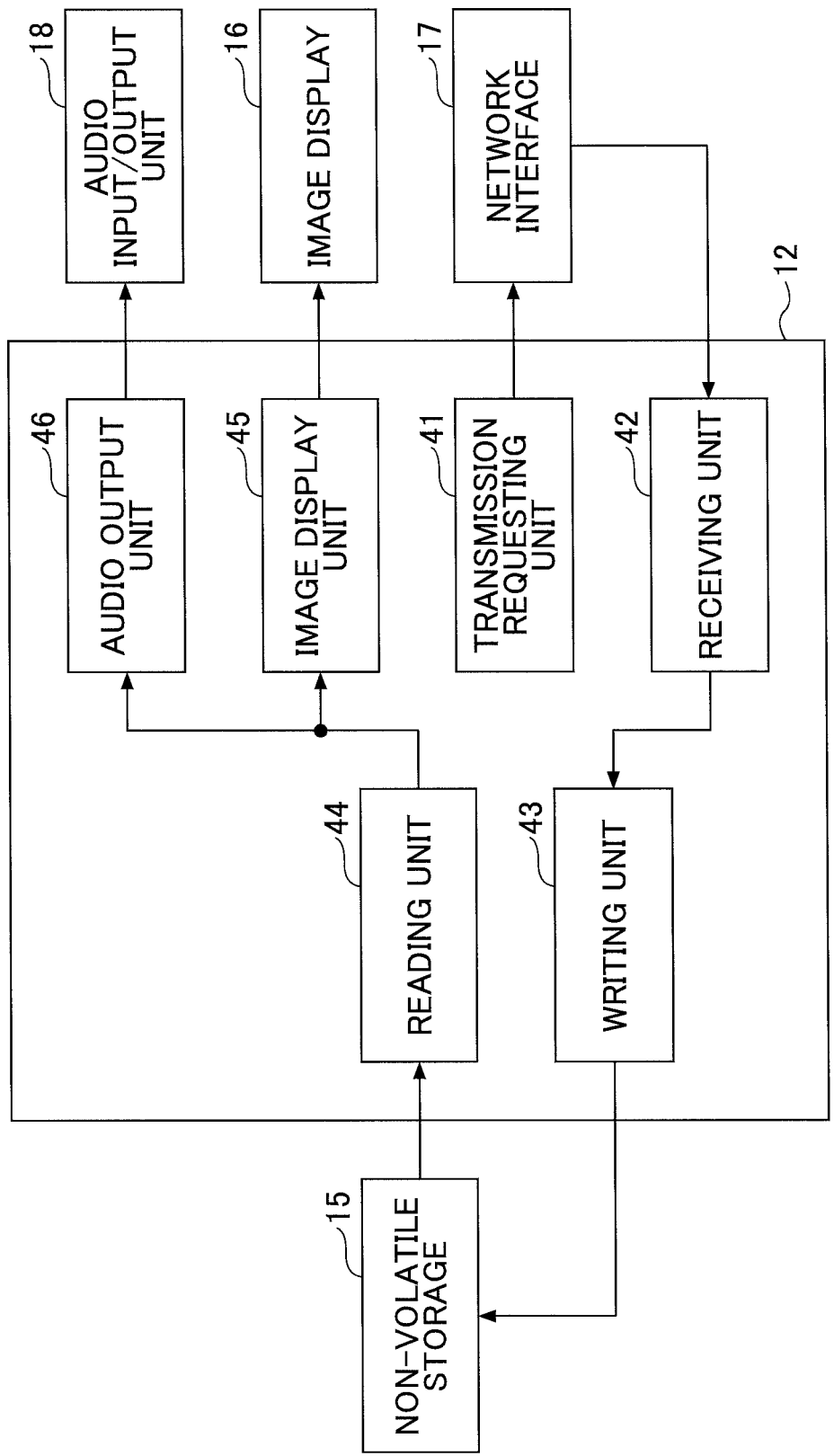
FIG. 6 is a block diagram illustrating an exemplary configuration of a controller of a terminal.

The controller 12 of the terminal 1 may include functional units (or processing blocks) as illustrated by FIG. 6. FIG. 6 is a block diagram illustrating an exemplary configuration of the controller 12 of the terminal 1. As in FIG. 6, the controller 12 may include a transmission requesting unit 41, a receiving unit 42, a writing unit 43, a reading unit 44, an image display unit 45, and an audio output unit 46.

The transmission requesting unit 41 transmits a transmission request for requesting transmission of data (video conference data) stored in the storage 25 via the network interface 17 to the information processing apparatus 3. The receiving unit 42 receives the data stored in the storage 25 via the network interface 17 from the information processing apparatus 3. The writing unit 43 writes the data received by the receiving unit 42 in the non-volatile storage 15.

The reading unit 44 reads the data from the non-volatile storage 15 and sends the data to the image display unit 45 and the audio output unit 46. The image display unit 45 displays video or images on the image display 16 based on the data received from the reading unit 44. The audio output unit 46 outputs audio via the audio input/output unit 18 based on the data received from the reading unit 44. The image display unit 45 and the audio output unit 46 may be collectively referred to as a playback unit.

[Functional Configuration of Information Processing Apparatus]

Figure 7:
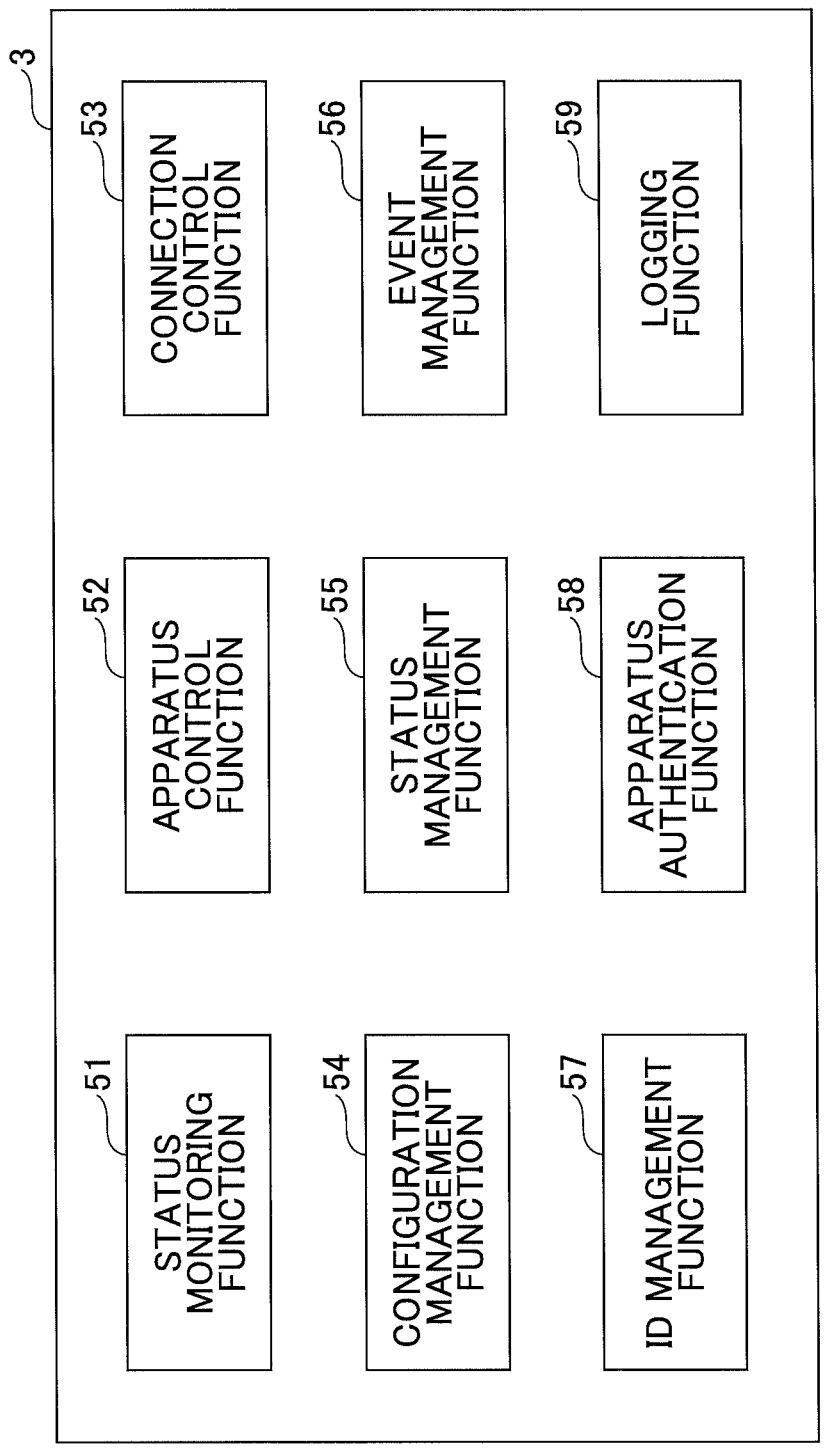
FIG. 7 is a drawing illustrating an exemplary functional configuration of an information processing apparatus.

FIG. 7 is a drawing illustrating an exemplary functional configuration of the information processing apparatus 3. FIG. 7 illustrates management and control functions that are a part of the functions provided by the information processing apparatus 3. As in FIG. 7, the information processing apparatus 3 may include a status monitoring function 51, an apparatus control function 52, a connection control function 53, a configuration management function 54, a status management function 55, an event management function 56, an ID management function 57, an apparatus authentication function 58, and a logging function 59.

The status monitoring function 51 monitors via the detection unit 32 whether the terminals 1 are operating normally and whether the terminals 1 are connected normally. The status monitoring function 51 also monitors network conditions (e.g., network bandwidth) via the status management unit 31. The apparatus control function 52 allows the terminals 1 to connect to (or join) conferences, and adjusts the image quality and frame rates of the terminals 1 based on the network conditions determined by the status monitoring function 51.

The connection control function 53 connects and disconnects the terminals 1. The configuration management function 54 manages information such an ID, an IP address, a MAC address, a name, a location, a pixel count (the number of pixels), and a frame rate for each of the terminals 1. The status management function 55 is provided by the status management unit 31. The event management function 56 manages, for example, responses to "join requests" requesting to join conference rooms (virtual conference rooms) of ongoing conferences and information indicating monitoring results (e.g., normal operation, disconnection, etc.) obtained by the status monitoring function 51.

The ID management function 57 manages unique identifiers or identification information (ID) of the terminals 1. The apparatus authentication function 58 allows authorized terminals 1 to connect to the information processing apparatus 3. The logging function 59 records error information and video conference logs. According to the present embodiment, the terminal 1 does not need to have functions as illustrated by FIG. 7. This in turn makes it possible to use low-capacity, low-cost terminals or general-purpose terminals as the terminals 1 constituting the cloud-network video conference system.

<Processes Performed in Video Conference System>

Exemplary processes performed in a video conference system of the present embodiment are described below. Here, it is assumed that a video conference system includes the information processing apparatus 3 and terminals 1a through 1e. When, for example, an error occurs in a network of the terminal 1a during a video conference and the terminal 1a becomes unable to continue the video conference, processes as described below are performed by the terminals 1 and the information processing apparatus 3. An error in the network of the terminal 1a may be caused, for example, by disconnection of an aged network cable, a network disconnection due to an insufficient network bandwidth, or a network disconnection due to power failure.

[Process Performed by Information Processing Apparatus]

Figure 8:
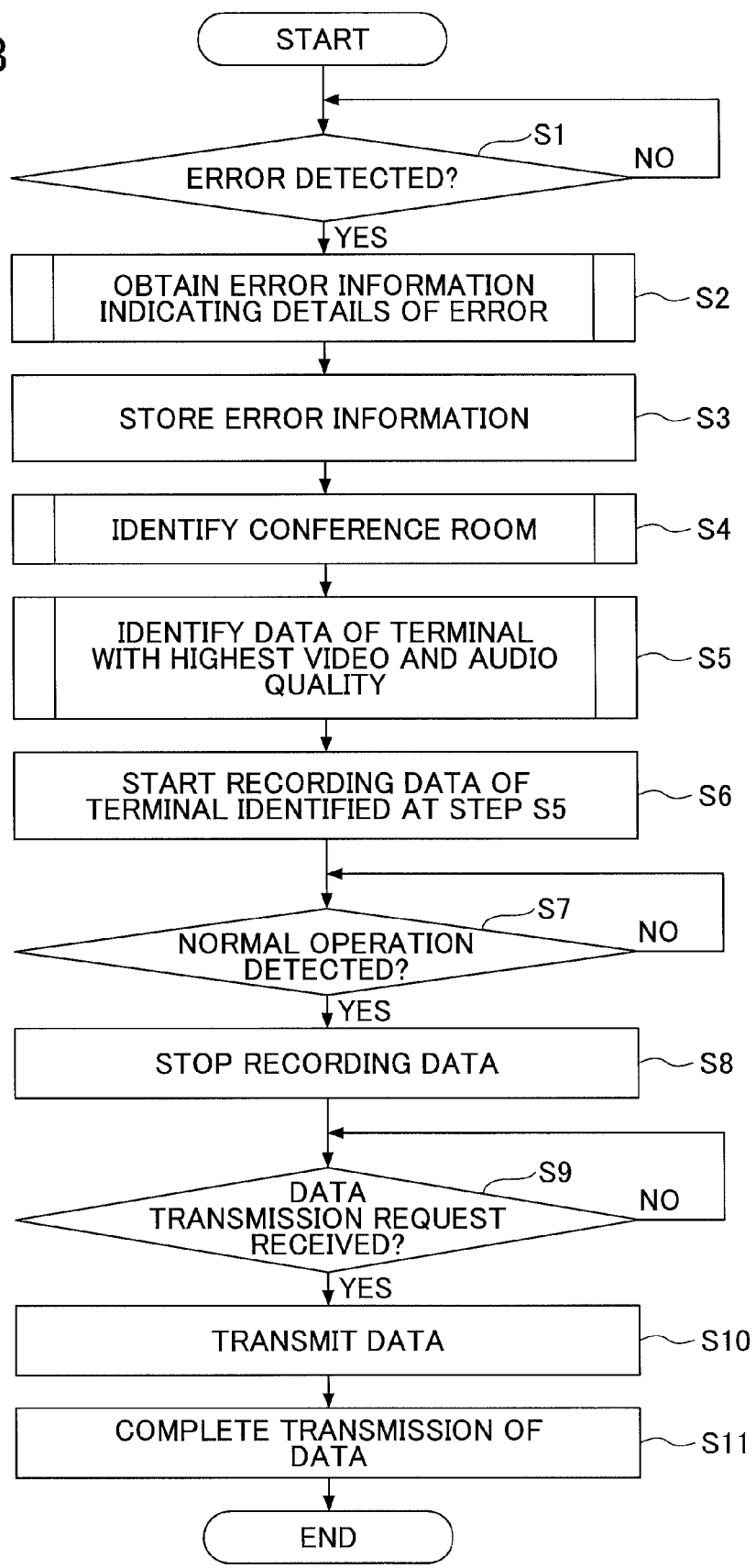
FIG. 8 is a flowchart illustrating an exemplary process performed by an information processing apparatus.

FIG. 8 is a flowchart illustrating an exemplary process performed by the information processing apparatus 3. At step S1, the detection unit 32 of the controller 22 of the information processing apparatus 3 detects an error or failure of the terminal 1a. For example, the detection unit 32 detects an error by monitoring a communication flag on TCP/IP, by polling the terminal 1, by determining whether a sufficient bandwidth is available, or by determining whether delay is within an acceptable range.

When an error is detected, the detection unit 32 reports the error to the status management unit 31 at step S2. The status management unit 31 obtains error information including, for example, information indicating the occurrence of the error at the terminal 1a, the time when the error occurred, the type of the error, and a conference (or conference room) in which the terminal 1a had been participating until the error occurred. Details of step S2 are described later.

At step S3, the status management unit 31 stores the error information. The status management unit 31 may store the error information in the storage 25 or a cache provided in the status management unit 31.

At step S4, the status management unit 31 identifies the conference room in which the terminal 1a had been participating based on the stored error information. Details of step S4 are described later.

At step S5, the status management unit 31 identifies one of the terminals 1b through 1e participating in the same conference room whose data has the highest video and audio quality. Details of step S5 are described later.

At step S6, the status management unit 31 requests the recording unit 33 to store the data of the identified terminal 1 (one of the terminals 1b through 1e identified at step S5). Then, the recording unit 33 (e.g., a memory controller) starts storing (or recording) the data (video conference data) of the identified terminal 1 in the storage 25. In the cloud-network video conference system of the present embodiment, an encoding technique such as H.264/SVC or H.264/AVC may be used.

With H.264/SVC, the information processing apparatus 3 can concurrently transmit multiple data streams with various quality levels (i.e., from a high definition and a high frame rate to a low definition and a low frame rate). For example, H.264/SVC makes it possible to concurrently transmit four types of data streams: "CIF@15fps", "CIF@30fps", "HD720p@15fps", and "HD720p@30fps". "CIF@15fps" indicates a data stream transmitted at 15 frames/s with the Common Intermediate Format (288 lines×352 pixels). "HD720p@15fps" indicates a data stream transmitted at 15 frames/s with the High Definition 720 progressive format (720 lines×1280 pixels).

Thus, when the same data of the same size is transmitted to multiple terminals 1, H.264/SVC enables each terminal 1 to select a frame rate and a pixel count according to the network traffic condition and the drawing capability of the terminal 1. Accordingly, H.264/SVC can be used even in an environment where the network bandwidth varies.

When a network error (disconnection) occurs in a cloud-network video conference system employing H.264/SVC, data with the highest definition and the highest frame rate is stored by the information processing apparatus 3.

In H.264/AVC, different from H.264/SVC, the pixel count and the frame rate are predetermined for each terminal 1 and data is transmitted at the predetermined pixel count and frame rate to the terminal 1.

When a network error (disconnection) occurs in a cloud-network video conference system employing H.264/AVC, data with the highest definition and the highest frame rate is stored by the information processing apparatus 3. That is, the information processing apparatus 3 stores data having the highest definition and frame rate among multiple sets of data of the terminals 1b through 1e connected to the same conference room as that where the terminal 1a (at which a network error occurred) had been participating.

When the terminal 1a recovers from the network error by, for example, replacing a disconnected network cable, the detection unit 32 of the controller 22 of the information processing apparatus 3 detects a normal operation at step S7. When a normal operation is detected, the detection unit 32 reports the normal operation to the status management unit 31 at step S7. The status management unit 31 obtains recovery information indicating that the terminal 1a has recovered from the error and the time of recovery, and stores the recovery information.

At step S8, the status management unit 31 requests the recording unit 33 to stop storing (or recording) the data (video conference data) of the terminal 1 in the storage 25 that has been started at step S6. The recording unit 33 stops storing the data (video conference data) of the terminal 1 in the storage 25.

Next, the transmission requesting unit 41 of the terminal 1a transmits a transmission request for requesting transmission of the data (video conference data) stored in the storage 25 via the network interface 17 to the information processing apparatus 3. At step S9, the detection unit 32 of the controller 22 of the information processing apparatus 3 detects the transmission request.

When the transmission request is detected, the detection unit 32 reports the transmission request to the status management unit 31 at step S10. The status management unit 31 determines one of the terminals 1 (in this example, the terminal 1a) that has transmitted the transmission request. Based on the determination result, the status management unit 31 requests the reading unit 34 to read the data requested by the transmission request from the storage 25. Then, the reading unit 34 reads the data requested by the transmission request from the storage 25. The data transmission unit 35 obtains network information of the terminal 1a from the status management unit 31, attaches the network information to the data read from the storage 25, and transmits the data via the network interface 23 to the terminal 1a. The data transmission unit 35 may be configured to perform this process when requested by the status management unit 31. In other words, the status management unit 31 may be configured to cause the data transmission unit 35 to transmit the data to the terminal 1a when a transmission request is received. At step S11, the reading unit 34 completes reading the data requested by the transmission request from the storage 25. Then, the data transmission unit 35 completes transmission of the data to the terminal 1a.

As described above, the information processing apparatus 3 is configured to start storing (or recording) video conference data in the storage 25 when an error or failure of a terminal 1 is detected and to stop storing (or recording) the video conference data in the storage 25 when recovery of the terminal 1 from the error is detected. Also, when a transmission request for the video conference data is received from the terminal 1, the information processing apparatus 3 transmits the video conference data stored in the storage 25 to the terminal 1.

Figure 9:
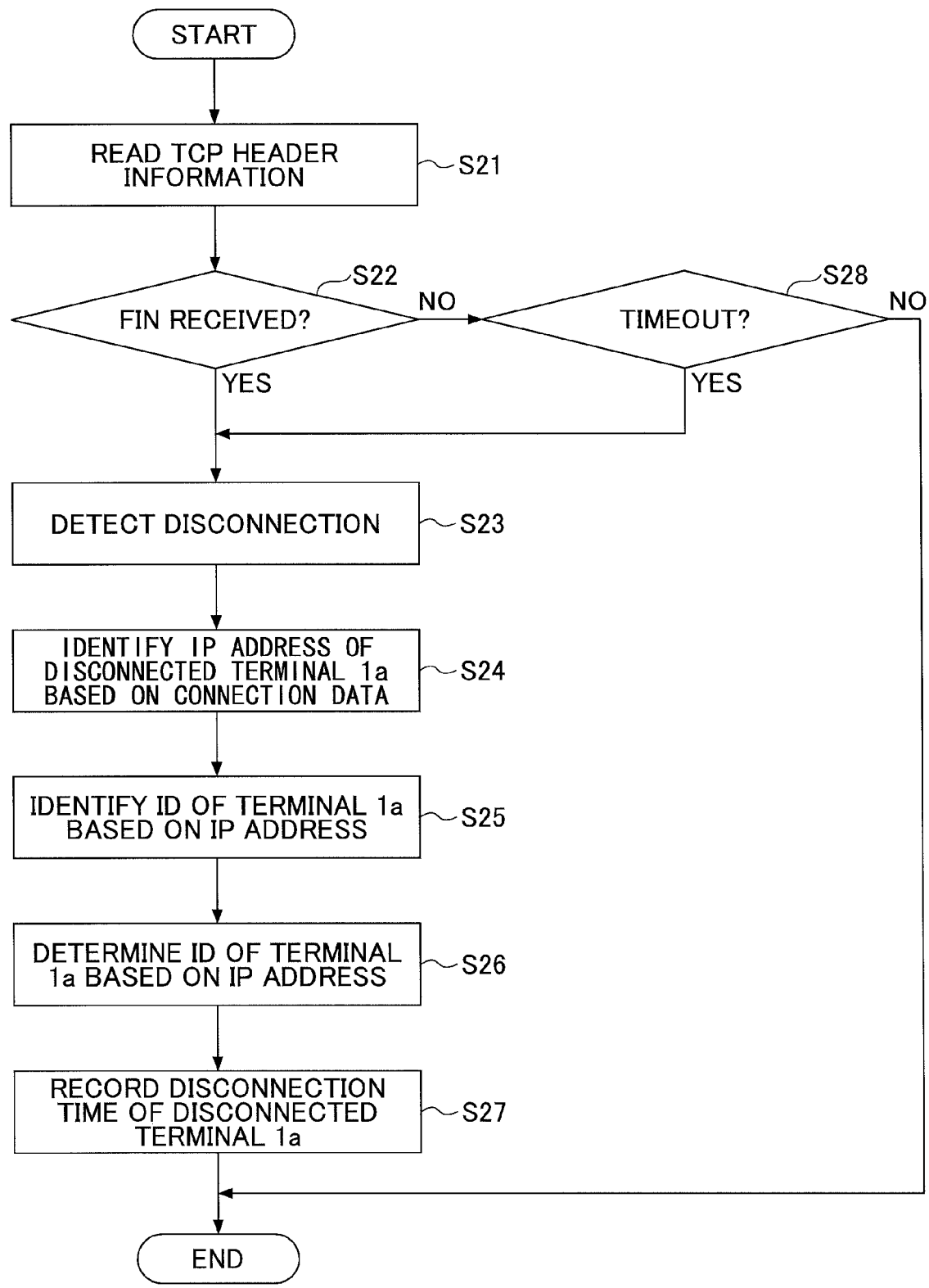
FIG. 9 is a flowchart illustrating details of step S2 of FIG. 8.

FIG. 9 is a flowchart illustrating details of step S2 of FIG. 8. At step S21, the detection unit 32 reads TCP header information. In step S22, the detection unit 32 determines whether a FIN flag has been received by referring to the TCP header information. The FIN flag is used to terminate a TCP connection. When the FIN flag is transmitted from both sides in communications, the TCP connection is terminated.

When the FIN flag is received, the detection unit 32 detects a disconnection at step S23. The detection unit 32 reports the disconnection to the status management unit 31. At step S24, the status management unit 31 identifies an IP address of the disconnected terminal 1a based on connection data. At step S25, the status management unit 31 identifies an ID based on the IP address. At step S26, the status management unit 31 determines the ID of the terminal 1a. At step S27, the status management unit 31 records the disconnection time of the disconnected terminal 1a. After step S27, the status management unit 31 terminates the process of FIG. 9.

On the other hand, when the FIN flag has not been received at step S22, the detection unit 32 determines, at step S28, whether timeout is detected. When timeout is detected, the detection unit 32 performs step S23 and subsequent steps. When timeout is not detected, the detection unit 32 terminates the process of FIG. 9. Thus, the information processing apparatus 3 can determine the status and condition of the disconnected terminal 1a.

Figure 10:
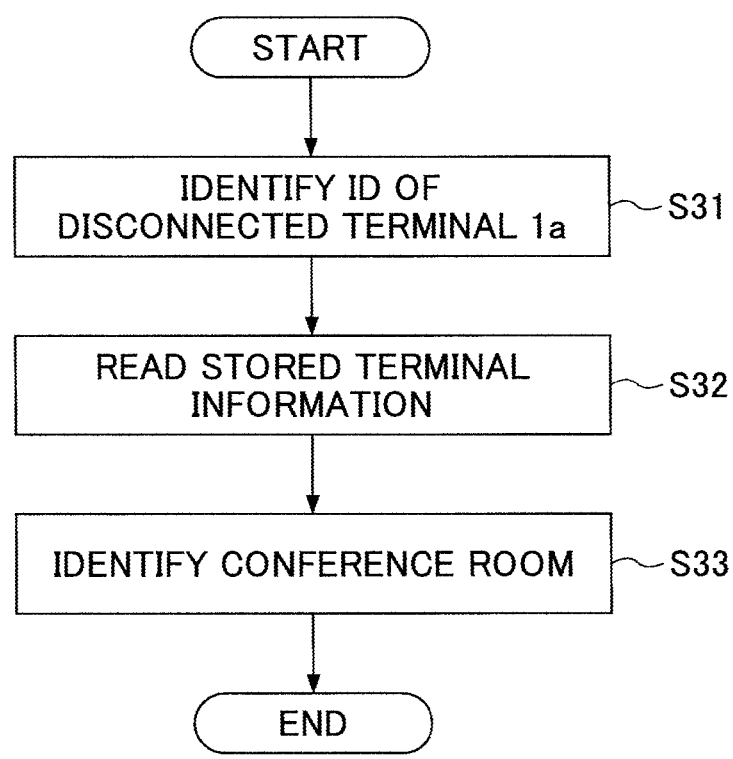
FIG. 10 is a flowchart illustrating details of step S4 of FIG. 8.

FIG. 10 is a flowchart illustrating details of step S4 of FIG. 8. At step S31, the status management unit 31 identifies the ID of the disconnected terminal 1a. At step S32, the status management unit 31 reads stored information (terminal information) from the storage 25 or an internal cache. At step S33, the status management unit 31 identifies a conference room of the disconnected terminal 1a (a conference room in which the terminal 1a had been participating) by referring to the read terminal information.

Thus, the information processing apparatus 3 can identify the conference room of the disconnected terminal 1a.

Figure 11:
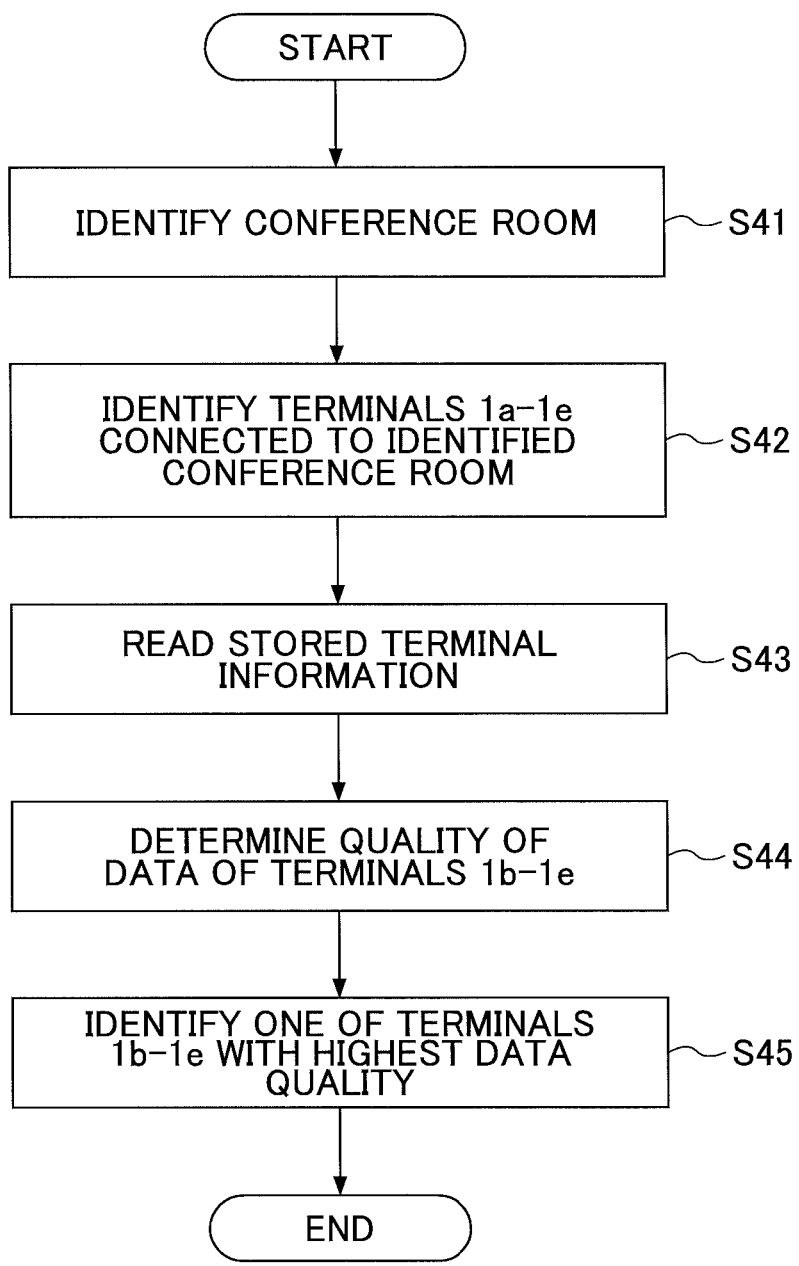
FIG. 11 is a flowchart illustrating details of step S5 of FIG. 8.

FIG. 11 is a flowchart illustrating details of step S5 of FIG. 8. At step S41, the status management unit 31 identifies the conference room of the disconnected terminal 1a. At step S42, the status management unit 31 identifies the terminals 1b through 1e connected to the identified conference room.

At step S43, the status management unit 31 reads stored information (terminal information) from the storage 25 or an internal cache. At step S44, the status management unit 31 determines the quality of data of the terminals 1b through 1e connected to the identified conference room by referring to the read terminal information.

At step S45, the status management unit 31 identifies one of the terminals 1b through 1e participating in the identified conference room whose data has the highest quality. Thus, the information processing apparatus 3 can identify data with the highest video and audio quality from multiple sets of data of the terminals 1b through 1e participating in the conference room in which the terminal 1a had been participating.

[Process Performed By Terminal]

Figure 12:
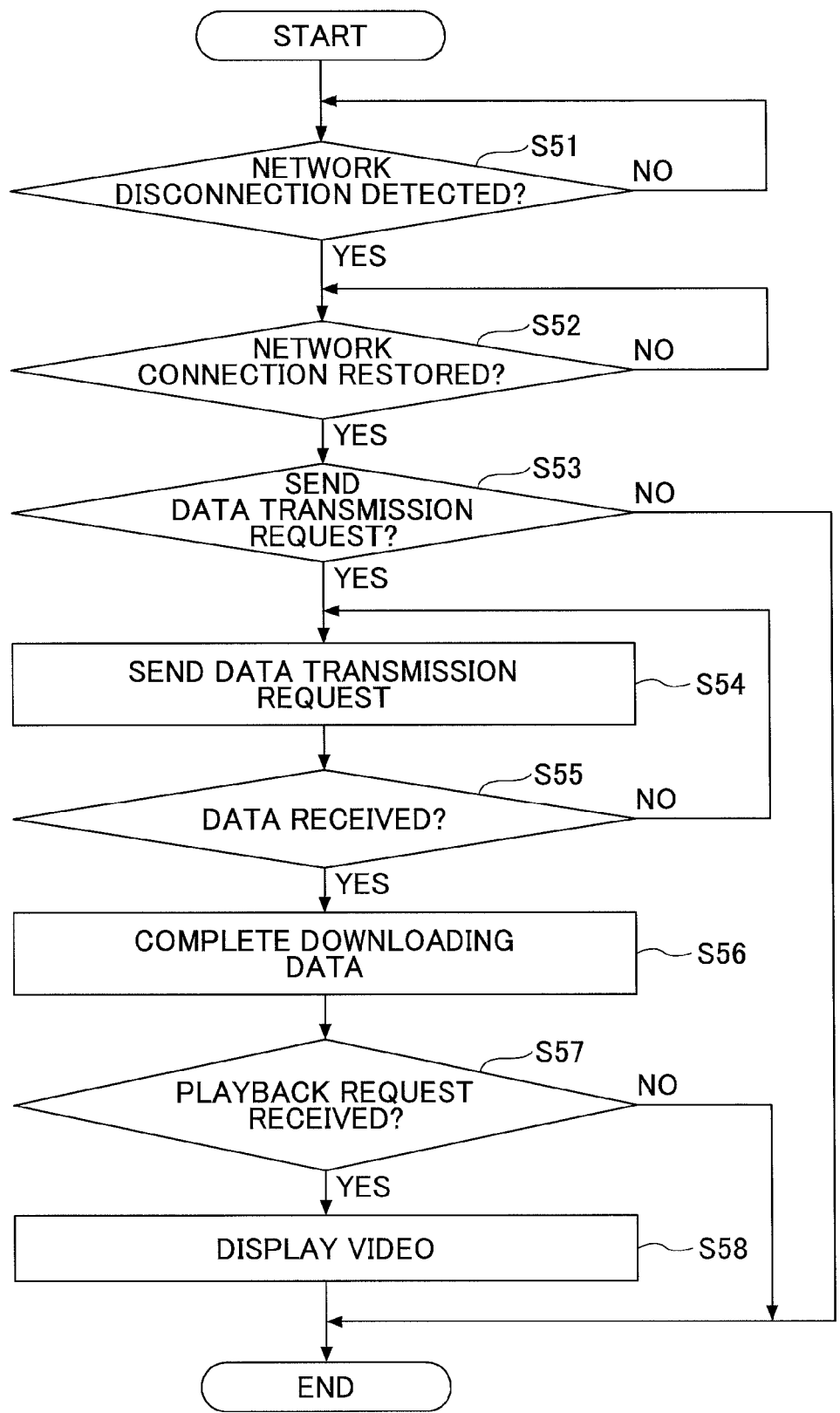
FIG. 12 is a flowchart illustrating an exemplary process performed by a terminal.

FIG. 12 is a flowchart illustrating an exemplary process performed by the terminal 1a. After the network disconnection is detected at step S51 and the network connection is restored at step S52, the terminal 1a performs step S53 and subsequent steps.

At step S53, the transmission requesting unit 41 of the terminal 1a determines whether to transmit a transmission request for requesting transmission of data (video conference data) stored in the storage 25 of the information processing apparatus 3.

When it is determined to transmit the transmission request, the transmission requesting unit 41, at step S54, transmits the transmission request via the network interface 17 to the information processing apparatus 3. At step S55, the receiving unit 42 of the terminal 1a receives data via the network interface 17. Then, the writing unit 43 writes the data received by the receiving unit 42 in the non-volatile storage 15. Steps S54 and S55 are repeated until the entire data (or all sets of data) is received. At step S56, the receiving unit 42 completes downloading the entire data.

At step S57, the reading unit 44 determines whether a playback request requesting to play the data written into the non-volatile storage 15 has been received. When the playback request has been received, the reading unit 44, at step S58, reads the data from the non-volatile storage 15 and sends the data to the image display unit 45 and the audio output unit 46. The image display unit 45 displays video or images on the image display 16 based on the data received from the reading unit 44. The audio output unit 46 outputs audio via the audio input/output unit 18 based on the data received from the reading unit 44.

On the other hand, when it is determined to not transmit the transmission request at step S53 or when no playback request has been received, the terminal 1a terminates the process of FIG. 12. Thus, the terminal 1a can receive data of a video conference conducted during a period of network disconnection from the information processing apparatus 3 after the network connection is restored, and play or display the received data.

[Process Performed in Video Conference System]

Figure 13:
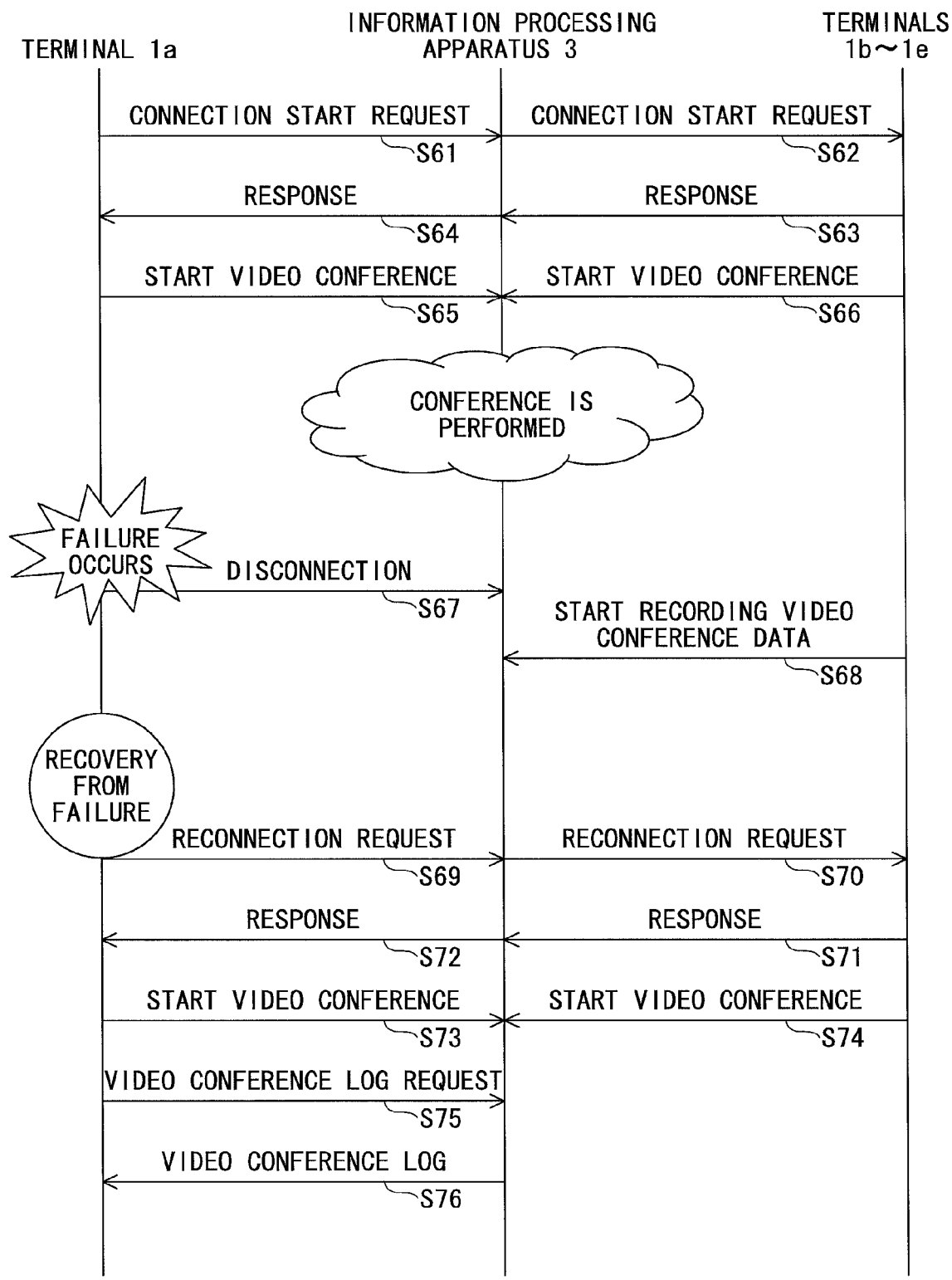
FIG. 13 is a sequence chart illustrating an exemplary process performed in a video conference system.

FIG. 13 is a sequence chart illustrating an exemplary process performed in the video conference system of the present embodiment. FIG. 13 illustrates a process where the terminals 1a through 1e start connections with the information processing apparatus 3, an error occurs at the terminal 1a, the terminal 1a recovers from the error, and recorded data is transmitted from the information processing apparatus 3 to the terminal 1a.

In FIG. 13, connection start requests are transmitted at steps S61 and S62, responses are transmitted at steps S63 and S64, and as a result, the terminals 1a through 1e are connected to the information processing apparatus 3. At steps S65 and S66, the information processing apparatus 3 connects the terminals 1a through 1e to a conference (or conference room) and thereby allows the terminals 1a through 1e to start a video conference. When an error or failure occurs at the terminal 1a, at step S67, the information processing apparatus 3 detects the error or failure (disconnection) of the terminal 1a. At step S68, the information processing apparatus 3 starts recording video conference data.

When the terminal 1a recovers from the error, reconnection requests are transmitted at steps S69 and S70, responses are transmitted at steps S71 and S72, and the terminal 1a is connected to the information processing apparatus 3. At steps S73 and S74, the information processing apparatus 3 connects the terminal 1a again to the conference and thereby allows the terminal 1a to start the video conference.

At step S75, the terminal 1a requests the information processing apparatus 3 to transmit the video conference data (video conference log) recorded after the detection of the error. At step S76, the terminal 1a receives the video conference data (video conference log) recorded after the detection of the error from the information processing apparatus 3.

Thus, the information processing apparatus 3 starts recording video conference data when an error or failure of the terminal 1a is detected. Also, when the video conference data recorded after the detection of the error is requested by the terminal 1a, the information processing apparatus 3 transmits the video conference data to the terminal 1a.

[Process Performed by Information Processing Apparatus to Start Connection]

Figure 14:
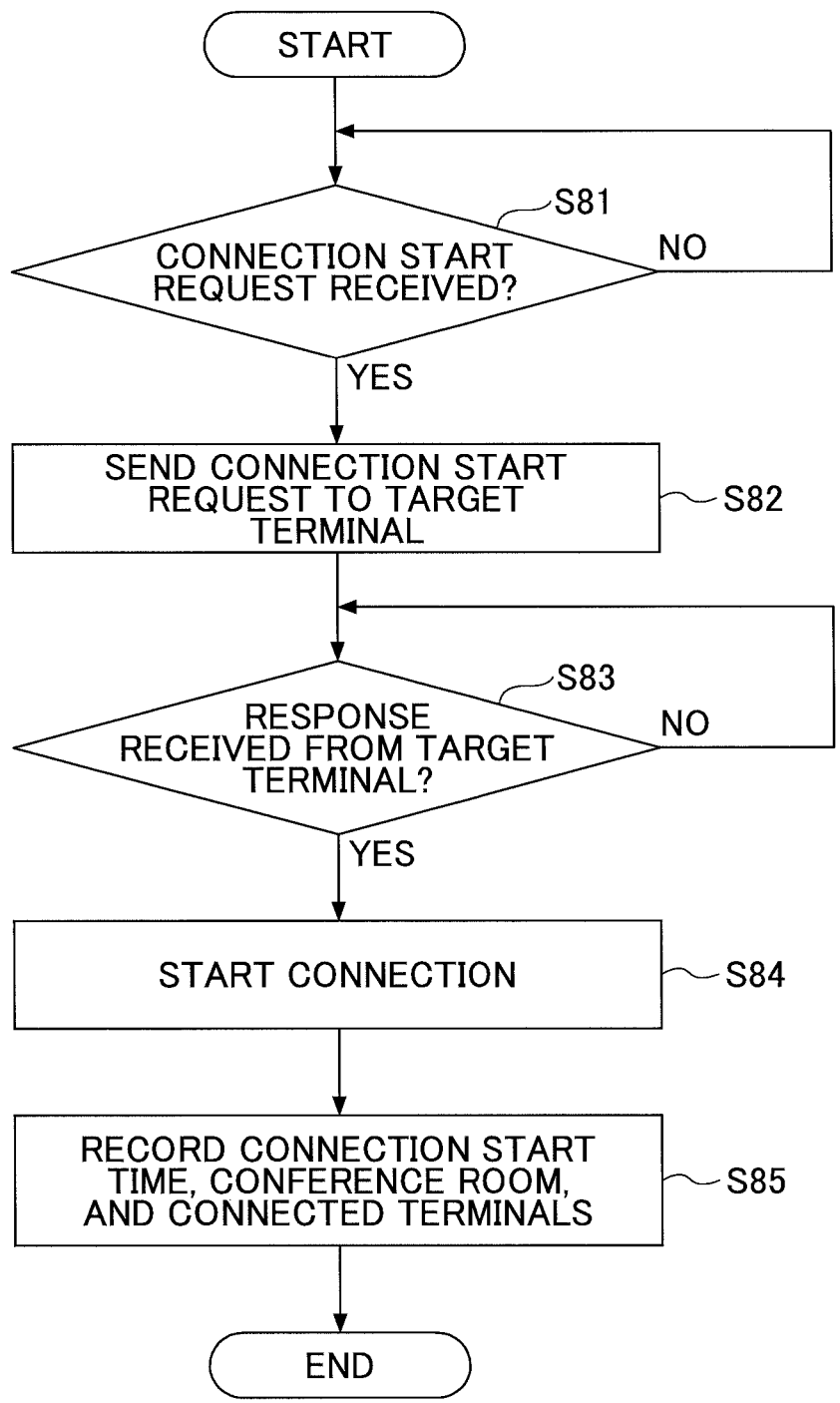
FIG. 14 is a flowchart illustrating an exemplary connection start process performed by an information processing apparatus.

FIG. 14 is a flowchart illustrating an exemplary connection start process performed by the information processing apparatus 3. At step S81, the information processing apparatus 3 determines whether a connection start request has been received from a connection-initiating terminal 1. When a connection start request has been received, the information processing apparatus 3 proceeds to step S82. At step S82, the information processing apparatus 3 sends the connection start request to connection-target terminals 1 to be connected.

At step S83, the information processing apparatus 3 determines whether responses have been received from the connection-target terminals 1. When responses have been received, the information processing apparatus 3 proceeds to step S84. At step S84, the information processing apparatus 3 starts connections of the connection-initiating terminal 1 and the connection-target terminals 1 to a conference (or conference room) and thereby allows the connection-initiating terminal 1 and the connection-target terminals 1 to start a video conference. At step S85, the information processing apparatus 3 records, for example, connection start time, a conference room, and connected terminals 1 in terminal information as illustrated by FIG. 15.

<Terminal Information>

FIG. 15 is a drawing illustrating exemplary terminal information. As illustrated in FIG. 15, terminal information of multiple terminals is stored, for example, in the storage 25 of the information processing apparatus 3. The terminal information may include fields such as "ID", "room" "IP address", "authentication".

"connection start time", "connection end time", "disconnection time", "recovery time", "event", "frame rate", "pixels", and "network bandwidth".

The ID field contains identification information (ID) for uniquely identifying the terminal 1. The room field contains information indicating a conference room. The conference room represents the type of conference such as "xxx regular meeting", "xxx release conference", or "xxx report meeting". The IP address field contains an IP address of the terminal 1. The authentication field contains an authentication result. The connection start time field contains the time when a connection to a conference room is started. The connection end time field contains the time when the connection to the conference room is ended.

The disconnection time field contains the time when a disconnection is detected. The recovery time field contains the time when the recovery of the terminal 1 is detected. The event field contains information indicating an event occurred during a video conference. The frame rate field and the pixels field contain information indicating the quality of data of the terminal 1. The network bandwidth filed contains a network condition (e.g., network bandwidth).

The terminal 1 can participate in multiple conference rooms at the same time. For example, in a cloud-network video conference system employing H.264/AVC, the frame rate and the pixel count for transmitting data are predetermined by the information processing apparatus 3 for each terminal 1 according to its network bandwidth. Because the data capacity varies depending on the terminals 1, the information processing apparatus 3 records data of one of the terminals 1 having the highest resolution and frame rate. With this approach, however, the size of recorded data may become large. Therefore, the information processing apparatus 3 may be configured to allow the user to select one of the terminals 1 whose data is to be recorded.

In the example of FIG. 15, a terminal 1 with an ID "101" was disconnected during a period "1/12 10:09-10:15" from a conference room "A", but terminals 1 with IDs "102" and "103" continued the video conference in the conference room "A". In this case, the information processing apparatus 3 accesses the terminal information stored by the status management unit 31 and refers to records related to the conference room "A". Then, the information processing apparatus 3 records data of the terminal 1 with the ID "102" that has a frame rate of 30 fps and a pixel count of 800×600, which are the highest among the participating terminals 1.

When the network bandwidth of the recovered terminal 1 with the ID "101" is small, the terminal 1 with the ID "101" cannot play the data with the frame rate of 30 fps and the pixel count of 800×600 in real time, but can download the data and play the downloaded data. Still, however, it is assumed that the terminal 1 with the ID "101" has a capability to play data with the frame rate of 30 fps and the pixel count of 800×600 as a basic specification.

That is, the terminal 1 with the ID "101" can perform a video conference by receiving and/or sending data with a frame rate of 10 fps and a pixel count of 600×480 when no disconnection occurs. Also, when connection is restored, the terminal 1 with the ID "101" can play data with a higher frame rate of 30 fps and a higher pixel count of 800×600.

On the other hand, in a cloud-network video conference system employing H.264/SVC, the information processing apparatus 3 can generate multiple data streams with various quality levels (i.e., from a high definition and a high frame rate to a low definition and a low frame rate). In this case, the terminal 1 can change the frame rate and the pixel count according to the network bandwidth. That is, in a cloud-network video conference system employing H.264/SVC, the frame rate and the pixel count of the same terminal 1 may vary depending on, for example, the time when a video conference is conducted. Accordingly, in a cloud-network video conference system employing H.264/SVC, data of a terminal 1 having the highest resolution and frame rate is selected from data of terminals 1 connected to the conference room and saved in the storage 25.

Alternatively, data to be stored may be selected in the same manner as in a cloud-network video conference system employing H.264/AVC. That is, the information processing apparatus 3 may access the terminal information stored by the status management unit 31 and refer to records related to the conference room "A". With the exemplary terminal information of FIG. 15, the information processing apparatus 3 records, in the storage 25, data of the terminal 1 with the ID "102" that has a frame rate of 30 fps and a pixel count of 800×600, which are the highest among the participating terminals 1.

With this approach, however, the size of recorded data may become large. Therefore, the information processing apparatus 3 may be configured to allow the user to select one of the terminals 1 whose data is to be recorded.

Here, because the frame rates and the pixel counts of the terminals 1 are variable, it is not guaranteed that a terminal 1 selected at a given time can continuously or totally provide a high resolution and a high frame rate. For this reason, the information processing apparatus 3 may be configured to calculate an average network bandwidth (during a period from the occurrence of an error to the recovery from the error) of each of the terminals 1 in the conference room and store data of one of the terminals 1 having the highest average network bandwidth.

[Processing of Video And Audio Data]

Video conference data may be stored in the storage 25 of the information processing apparatus 3 in a widely-used video/audio file format such as mp4, avi, or mov.

To generate such a video/audio file, the information processing apparatus 3 needs to include a video/audio encoding function. The encoding function may be implemented based on a widely-used compression scheme such as H.264/AVC. Also, the encoding function may be implemented either as software or hardware.

Figure 4B:
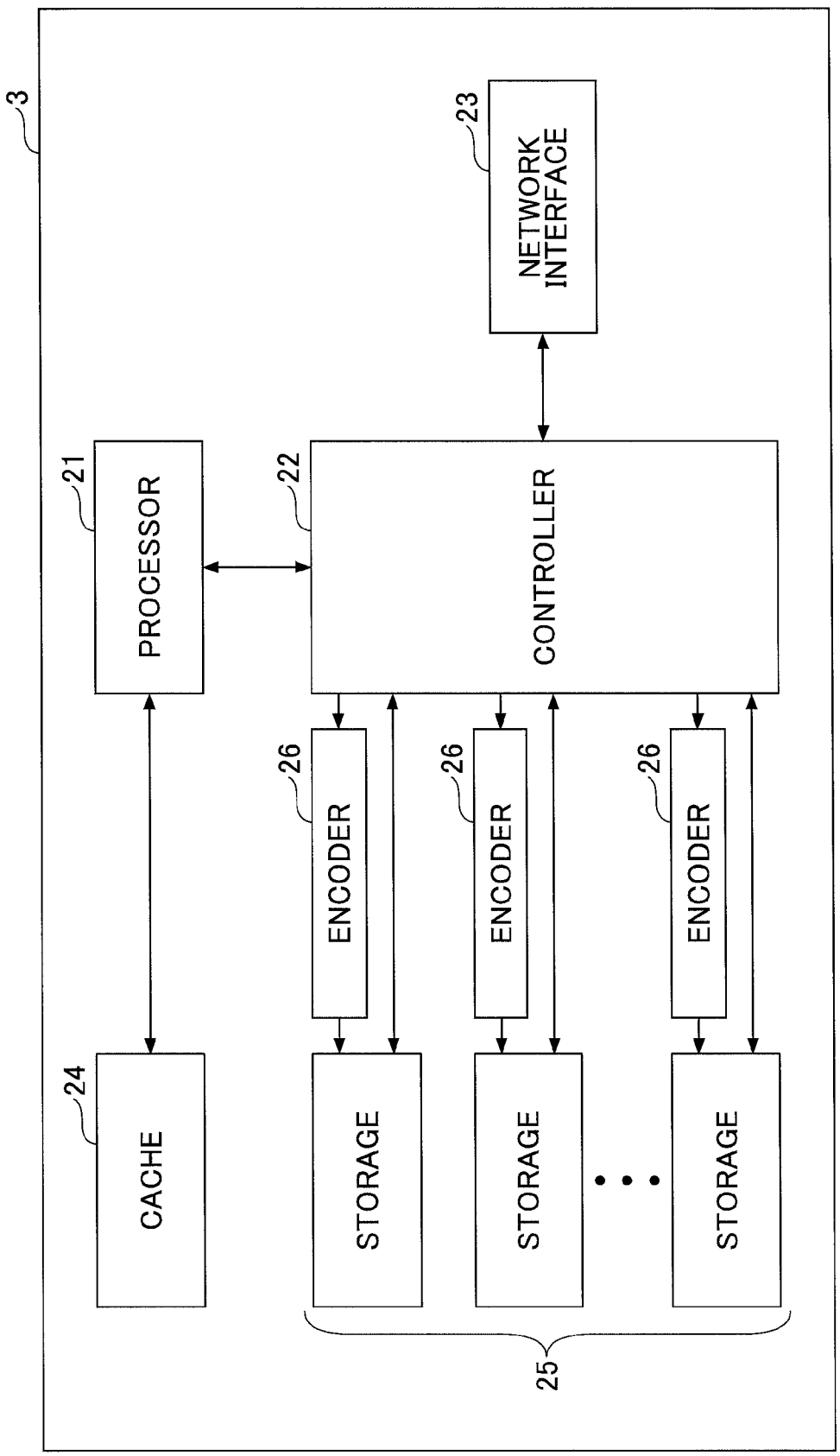
FIG. 4B is a block diagram illustrating another exemplary hardware configuration of an information processing apparatus.

When the encoding function is implemented as software, the encoding function may be executed by the processor 21 of the information processing apparatus 3 (see FIG. 4A). On the other hand, when the encoding function is implemented as hardware, encoders 26 may be provided between the storages 25 and the controller 22 as illustrated in FIG. 4B. Each of the encoders 26 encodes (or compresses) a video/audio file and stores the encoded video/audio file in the corresponding storage 25.

Next, a process performed by the terminal 1 to play a downloaded video/audio file is described.

To play a video/audio file encoded (or compressed) by the encoding function of the information processing apparatus 3, the terminal 1 needs a video/audio codec function for decoding (or decompressing) the video/audio file. Similarly to the encoding function of the information processing apparatus 3, the codec function may also be implemented as software or hardware.

Figure 3B:
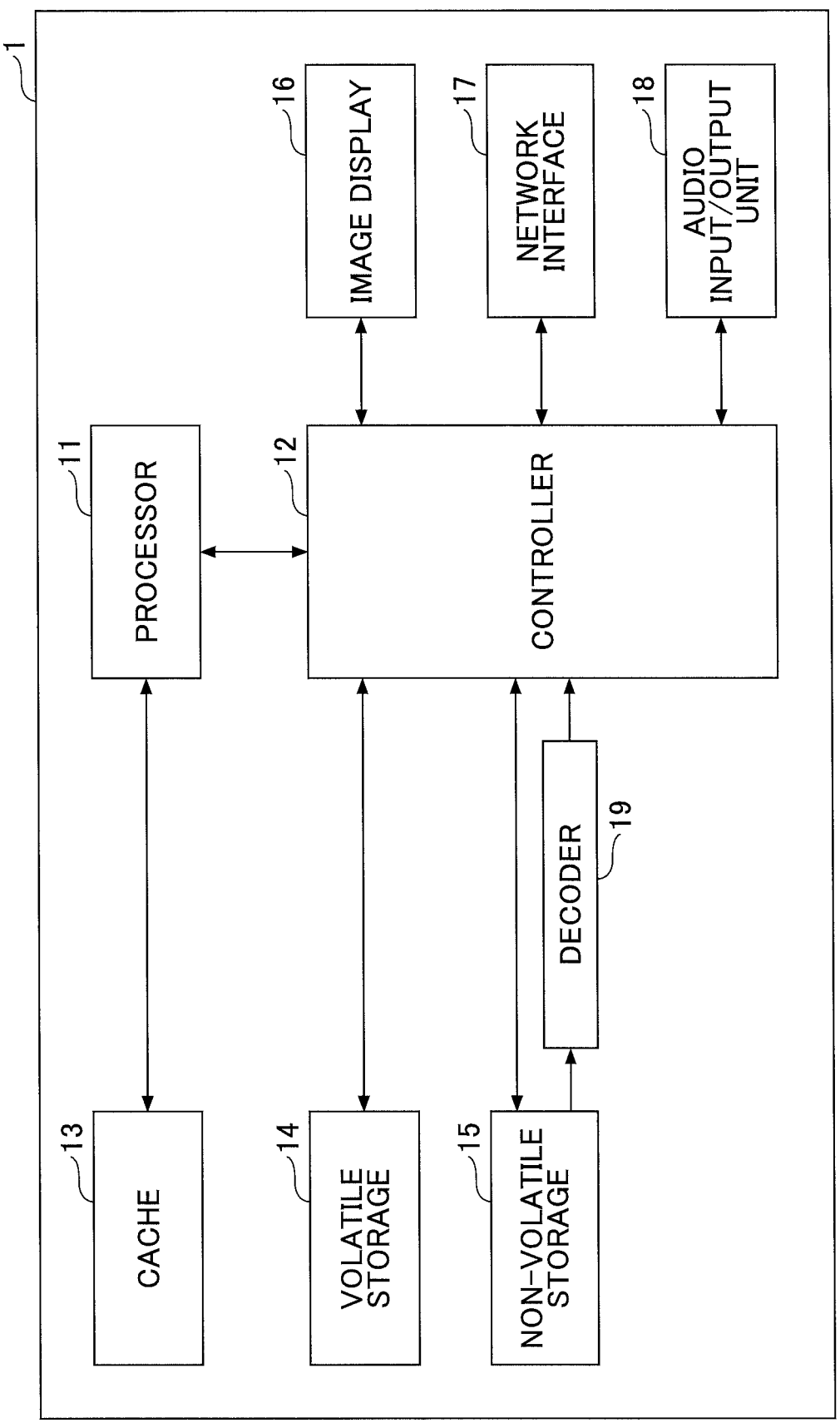
FIG. 3B is a block diagram illustrating another exemplary hardware configuration of a terminal.

When the codec function is implemented as software, the codec function may be executed by the processor 11 of the terminal 1 (see FIG. 3A). On the other hand, when the codec function is implemented as hardware, a decoder 19 may be provided between the non-volatile storage 15 and the controller 12 as illustrated in FIG. 3B. The decoder 19 reads a video/audio file stored in the non-volatile storage 15, decodes (or decompresses) the video/audio file, and outputs the decoded video/audio file to the controller 12.

In this case, the controller 12 converts the decoded video/audio file according to, for example, the screen resolution of the image display 16 and the specifications of interfaces between the controller 12 and the image display 16 and the audio input/output unit 18. Then, the controller 12 sends the converted video/audio file to the image display 16 and the audio input/output unit 18. The image display 16 displays video or images and the audio input/output unit 18 outputs sounds based on the video/audio file sent from the controller 12.

<Summary>

In the video conference system of the first embodiment, the information processing apparatus 3 can record data during a period from the occurrence of an error to the recovery from the error, and the terminal 1 can play the recorded data.

<<Second Embodiment>>

In the video conference system of the first embodiment, the information processing apparatus 3 records data during a period from the occurrence of an error to the recovery from the error, and the terminal 1 plays the recorded data. Here, with the configuration of the first embodiment, because a conference continues even while the data is downloaded and played after the recovery from an error, a participant who joins the conference after playing the data may not be able to understand the current status of the conference. For this reason, according to a second embodiment, the information processing apparatus 3 is configured to be able to record data even after the recovery from an error.

As described above, the information processing apparatus 3 can identify a conference room in which a failed (or disconnected) terminal 1 had been participating. The information processing apparatus 3 sequentially stores data sent from terminals 1 other than the failed terminal 1 in the identified conference room. Still, however, the information processing apparatus 3 may be configured to record data during a period from the occurrence of an error to the recovery from the error by default.

For example, the terminal 1 may include an operations unit in addition to the components as illustrated in FIGS. 3A and 3B. In this case, the user may operate the operations unit to request the information processing apparatus 3 to extend a recording period (a period for recording data) and thereby record data, for example, from the occurrence of an error to the end of a conference. Also, when the image display 16 illustrated in FIGS. 3A and 3B is implemented by a touch panel, the user may operate the touch panel to request the information processing apparatus 3 to extend the recording period.

Further, an extension setting to extend the recording period (e.g., to a period from the occurrence of an error to the end of a conference) may be provided on a setting screen or a pop-up screen used to connect to conference rooms to allow the user to specify the extension setting before connecting to a conference room. The extension setting may be reported from the terminal 1 to the information processing apparatus 3 as extension setting information when the terminal 1 is connected to a conference room. The information processing apparatus 3 may be configured to manage the extension setting information for each conference room and for each terminal 1. When the extension setting is specified, the information processing apparatus 3 continues to record data even when the recovery of the terminal 1 from an error is detected.

Figure 16:
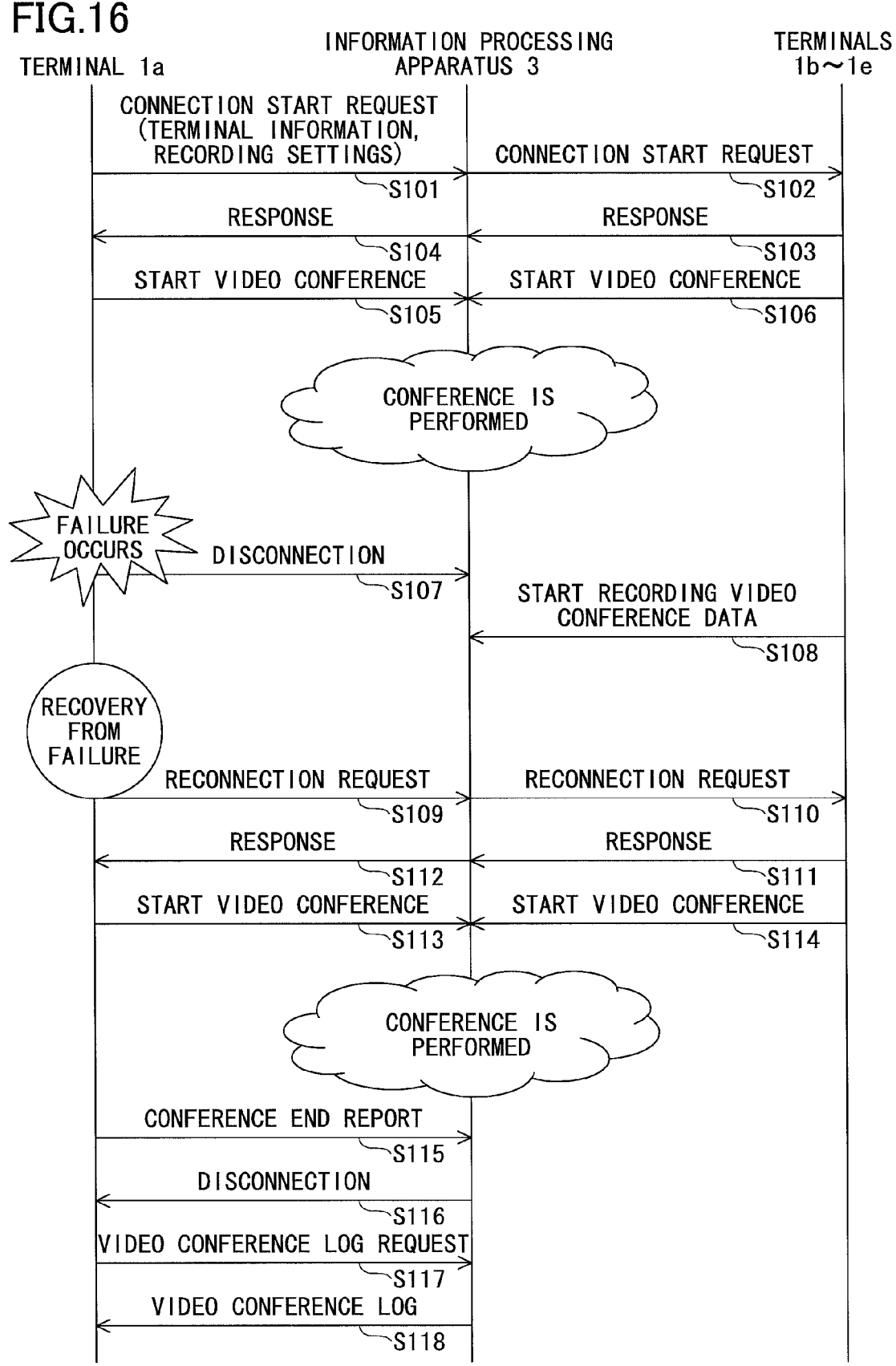
FIG. 16 is a sequence chart illustrating another exemplary process performed in a video conference system.

FIG. 16 is a sequence chart illustrating an exemplary process performed in a video conference system according to the second embodiment. Below, descriptions of steps that are substantially the same as those described in the first embodiment may be omitted.

In FIG. 16, connection start requests are transmitted at steps S101 and S102, responses are transmitted at steps S103 and S104, and as a result, the terminals 1a through 1e are connected to the information processing apparatus 3. The connection start request transmitted at step S101 may include terminal information and recording setting information that includes the extension setting information described above.

At steps S105 and S106, the information processing apparatus 3 connects the terminals 1a through 1e to a conference (or conference room) and thereby allows the terminals 1a through 1e to start a video conference. When an error or failure occurs at the terminal 1a, at step S107, the information processing apparatus 3 detects the error or failure of the terminal 1a. At step S108, the information processing apparatus 3 starts recording video conference data.

When the terminal 1a recovers from the error, reconnection requests are transmitted at steps S109 and S110, responses are transmitted at steps S111 and S112, and the terminal 1a is connected to the information processing apparatus 3. At steps S113 and S114, the information processing apparatus 3 connects the terminal 1a again to the conference and thereby allows the terminal 1a to start the video conference.

At step S115, the information processing apparatus 3 receives a conference end report from the terminal 1a. At step S116, the information processing apparatus 3 disconnects the terminal 1a. At step S117, the terminal requests the information processing apparatus 3 to transmit the video conference data (video conference log) recorded from the occurrence of the error to the end of the video conference. At step S118, the terminal 1a receives the video conference data (video conference log) from the information processing apparatus 3.

With the above configuration, the information processing apparatus 3 can record video conference data from the occurrence of an error at the terminal 1a to the end of the video conference. Also, in response to a request from the terminal 1a, the information processing apparatus 3 can transmit video conference data recorded from the occurrence of an error at the terminal 1a to the end of the video conference.

<<Third Embodiment>>

In the video conference system of the first embodiment, the information processing apparatus 3 records data during a period from the occurrence of an error to the recovery from the error, and the terminal 1 plays the recorded data. Here, with the configuration of the first embodiment, when a long delay occurs or the frame rate decreases drastically, it may become difficult to understand the discussion in a conference (or the contents of the conference) even if no disconnection occurs. For this reason, in a third embodiment, the information processing apparatus 3 records data not only when a disconnection occurs but also when a certain level of network delay or frame rate reduction occurs, until the terminal 1 recovers from such an error.

In the third embodiment, terminal information includes a network delay field containing information indicating a network delay. The network delay in the terminal information of a given terminal 1 indicates the amount of time that data transmitted from another terminal 1 takes to reach the given terminal 1. According to the third embodiment, a threshold for the network delay and/or a threshold for the frame rate is set in the status management unit 31 of the information processing apparatus 3, and the information processing apparatus 3 records data when the network delay becomes greater than or equal to the threshold and/or the frame rate becomes less than or equal to the threshold.

<<Fourth Embodiment>>

In the first embodiment, recorded data is downloaded and then played by the terminal 1. With this approach, it may take time to download data when the size of the data is large, and it is inconvenient for a user who needs to view what is discussed in a conference immediately. For this reason, in a fourth embodiment, recorded data is streamed.

Using a known streaming technology, the terminal 1 can display data on the image display 16 while recording the data in the non-volatile storage 15. The fourth embodiment may be combined with the second embodiment. That is, the recording period may be extended up to the end of a conference, and the terminal 1 can stream data recorded from the occurrence of an error to the end of the conference.

<<Fifth Embodiment>>

In the first embodiment, it is assumed that the terminal 1 can recover from an error or failure. However, there may be a case where the terminal 1a is broken by an accident (e.g., dropped onto the floor) during a conference and cannot be restored. According to a fifth embodiment, when the terminal 1a participating in a conference room "A" cannot recover from an error or failure, video conference data (video conference log) of the conference room "A" is received by, for example, the terminal 1d participating in a conference room "B".

Figure 17:
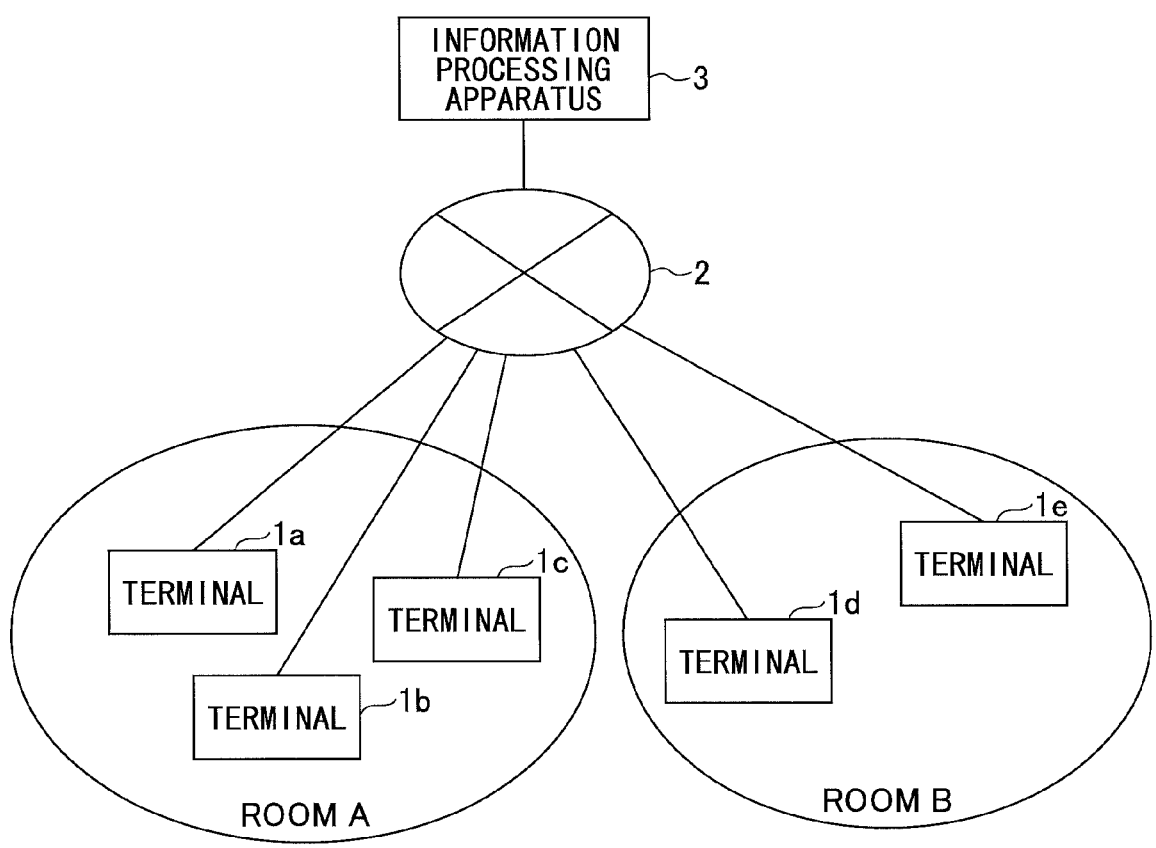
FIG. 17 is a drawing illustrating terminals connected to conference rooms.

FIG. 17 illustrates an exemplary case where the terminals 1a through 1c are connected the conference room "A" and the terminals 1d and 1e are connected the conference room "B".

Figure 18:
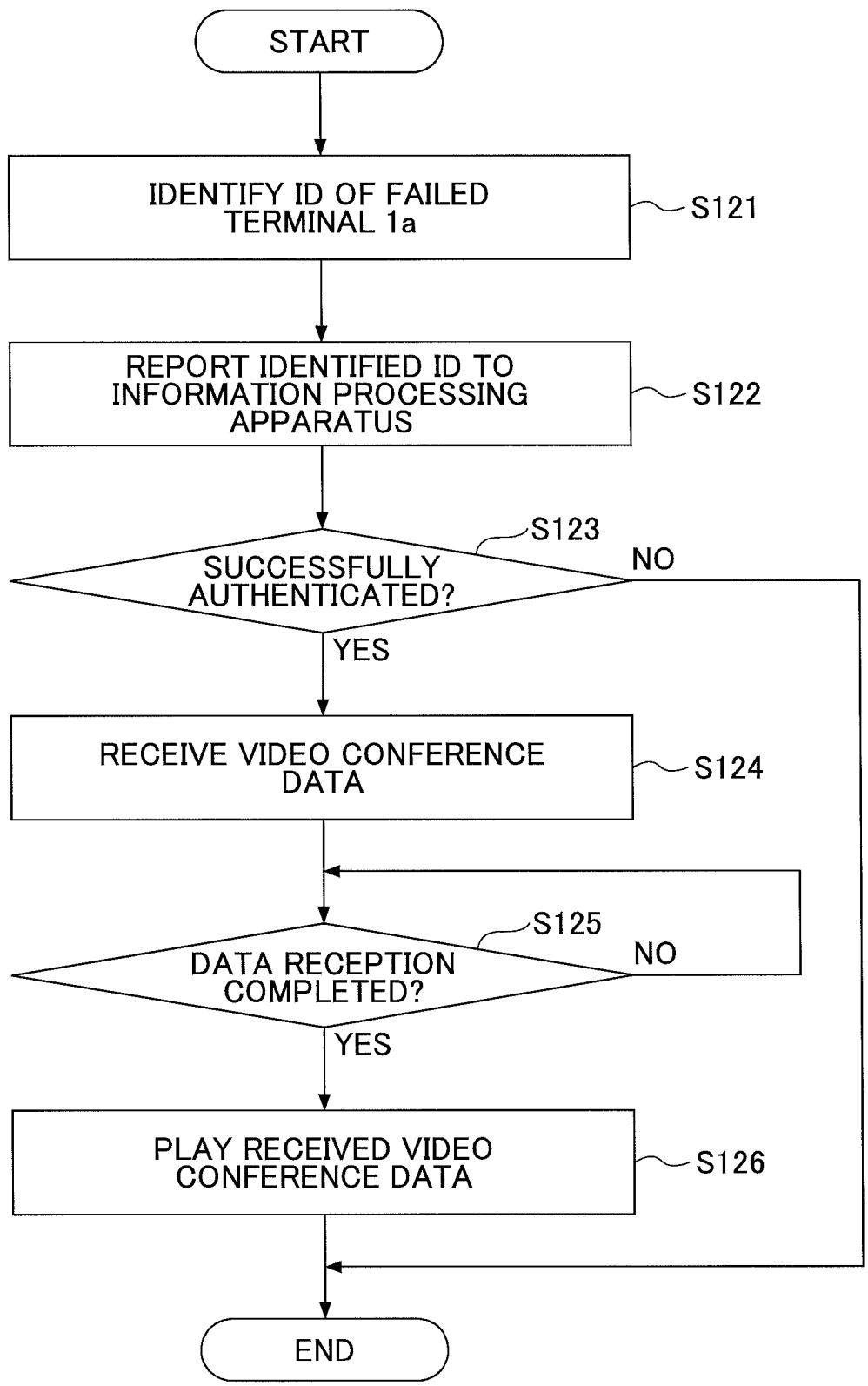
FIG. 18 is a flowchart illustrating an exemplary process of receiving video conference data by a terminal participating in a different conference room.

FIG. 18 is a flowchart illustrating an exemplary process of receiving video conference data by a terminal participating in a different conference room. At step S121, the terminal 1d connected to the conference room "B" identifies the ID of the failed (and unrecoverable) terminal 1a based on, for example, a user input.

At step S122, the terminal 1d reports the ID of the failed terminal 1a to the information processing terminal 3. At step S123, the information processing apparatus 3 performs authentication to determine whether to transmit the video conference data of the conference room "A", in which the failed terminal 1a had been participating, to the terminal 1d participating in the conference room "B".

For this authentication, i.e., in case an unrecoverable error occurs, the terminal 1a reports, when starting connection to the conference room "A", the ID of the terminal 1d allowed to download and play the video conference data of the conference room "A" to the information processing apparatus 3.

When the terminal 1d is successfully authenticated, at step S124, the terminal 1d receives the video conference data of the conference room "A" from the information processing apparatus 3. When the reception of the video conference data is completed at step S125, the terminal 1d proceeds to step S126. At step S126, the terminal 1d plays the received video conference data of the conference room "A". On the other hand, when the authentication fails at step S123, the information processing apparatus 3 terminates the process of FIG. 18.

As described above, in a video conference system according to the embodiments of the present invention, the information processing apparatus 3 records video conference data when the terminal 1 is disconnected due to, for example, an insufficient network bandwidth, a network failure such as packet loss, or an accident (e.g., abortion of a conference caused by power failure or an operational error); and after the connection is restored, the terminal 1 can play the video conference data recorded while the terminal 1 is disconnected. With this configuration, a participant of a video conference, i.e., a user of the disconnected terminal 1, can view discussions conducted during a period from the occurrence of a network disconnection to the recovery from the network disconnection.

An aspect of this disclosure provides an information processing apparatus, a conference system, and a storage medium storing a program for causing a computer to function as the information processing apparatus that make it possible to record video conference data when an error or failure occurs and output the recorded video conference data after the recovery from the error or failure.

An information processing apparatus, a conference system, and a storage medium are described above as preferred embodiments. However, the present invention is not limited to the specifically disclosed embodiments, and variations and modifications may be made without departing from the scope of the present invention.

What is claimed is:

1. An information processing apparatus for a conference system where a plurality of terminals are connected via a network to the information processing apparatus and exchange data via the information processing apparatus to conduct a conference, the information processing apparatus comprising:
   a detection unit that detects disconnection of a terminal of the terminals from the information processing apparatus and recovery of the terminal from the disconnection;
   a recording unit;
   a data transmission unit; and
   a status management unit that
      causes the recording unit to start recording the data in a storage when the disconnection is detected by the detection unit, and
      causes the data transmission unit to transmit the data read from the storage to the terminal in response to a data transmission request from the terminal,
      wherein the information processing apparatus is configured to allow the terminal to select items to be detected by the detection unit, contents of the data to be recorded by the recording unit, and contents of the data to be transmitted by the data transmission unit.

2. The information processing apparatus as claimed in claim 1, wherein the status management unit
   causes the recording unit to record the data in the storage during a period from when the disconnection is detected to when the recovery is detected by the detection unit, and
   causes the data transmission unit to transmit the data recorded during the period to the terminal.

3. The information processing apparatus as claimed in claim 1, wherein the status management unit
  causes the recording unit to record the data in the storage during a period from when the disconnection is detected by the detection unit to when the conference ends, and
  causes the data transmission unit to transmit the data recorded during the period to the terminal.

4. The information processing apparatus as claimed in claim 1, wherein
  the detection unit detects at least one of a network delay and a frame rate; and
  the status management unit
    causes the recording unit to record the data in the storage during a period when at least the network delay is greater than or equal to a threshold or the frame rate is less than or equal to a threshold, and
    causes the data transmission unit to transmit the data recorded during the period to the terminal.

5. The information processing apparatus as claimed in claim 1, wherein the data transmission unit streams the data read from the storage to allow the terminal to play the data while receiving the data.

6. The information processing apparatus as claimed in claim 1, wherein the status management unit causes the data transmission unit to transmit the data read from the storage to a terminal that is different from the terminal whose disconnection is detected by the detection unit.

7. A conference system, comprising:
  an information processing apparatus; and
  a plurality of terminals that are connected via a network to the information processing apparatus and exchange data via the information processing apparatus to conduct a conference,
  wherein the information processing apparatus includes
    a detection unit that detects disconnection of a terminal of the terminals from the information processing apparatus and recovery of the terminal from the disconnection,
    a recording unit,
    a data transmission unit, and
    a status management unit that
      causes the recording unit to start recording the data in a storage when the disconnection is detected by the detection unit, and
      causes the data transmission unit to transmit the data read from the storage to the terminal in response to a data transmission request from the terminal; and
  wherein each of the terminals includes
    a transmission requesting unit that requests the information processing apparatus to transmit the data recorded in the storage after the recovery from the disconnection, and
    a playback unit that plays the data received from the information processing apparatus,
  wherein the information processing apparatus is configured to allow the terminal to select items to be detected by the detection unit, contents of the data to be recorded by the recording unit, and contents of the data to be transmitted by the data transmission unit.

8. A non-transitory computer-readable storage medium storing program code for causing a computer to function as an information processing apparatus for a conference system where a plurality of terminals are connected via a network to the information processing apparatus and exchange data via the information processing apparatus to conduct a conference, the information processing apparatus comprising:
  a detection unit that detects disconnection of a terminal of the terminals from the information processing apparatus and recovery of the terminal from the disconnection;
  a recording unit;
  a data transmission unit; and
  a status management unit that
    causes the recording unit to start recording the data in a storage when the disconnection is detected by the detection unit, and
    causes the data transmission unit to transmit the data read from the storage to the terminal in response to a data transmission request from the terminal,
  wherein the information processing apparatus is configured to allow the terminal to select items to be detected by the detection unit, contents of the data to be recorded by the recording unit, and contents of the data to be transmitted by the data transmission unit.

* * * * *